(12) United States Patent
Yasumatsu

(10) Patent No.: US 12,717,222 B2
(45) Date of Patent: Aug. 25, 2026

(54) LIGHT SOURCE DEVICE AND PROJECTOR

(71) Applicant: SEIKO EPSON CORPORATION, Tokyo (JP)

(72) Inventor: Wataru Yasumatsu, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 308 days.

(21) Appl. No.: 18/381,241

(22) Filed: Oct. 18, 2023

(65) Prior Publication Data

US 2024/0134259 A1 Apr. 25, 2024
US 2024/0231206 A9 Jul. 11, 2024

(30) Foreign Application Priority Data

Oct. 19, 2022 (JP) ................................ 2022-167782

(51) Int. Cl.
*G03B 21/20* (2006.01)
*G03B 21/16* (2006.01)

(52) U.S. Cl.
CPC ..... *G03B 21/2013* (2013.01); *G03B 21/2066* (2013.01); *G03B 21/208* (2013.01); *G03B 21/16* (2013.01); *G03B 21/2033* (2013.01)

(58) Field of Classification Search
CPC .................. G03B 21/00–64; H04N 9/31–3197
See application file for complete search history.

(56) References Cited

U.S. PATENT DOCUMENTS 10,649,324 B2 5/2020 Akiyama
2019/0056646 A1 2/2019 Akiyama
2019/0235372 A1* 8/2019 Yamamoto ......... G03B 21/2013
2021/0286248 A1 9/2021 Lin et al.
2025/0237936 A1* 7/2025 Yan ....................... G03B 21/20

FOREIGN PATENT DOCUMENTS

JP 2007-003914 A 1/2007
JP 2013-065414 A 4/2013
JP 2019-035922 A 3/2019

* cited by examiner

*Primary Examiner* — Christopher A Lamb, II
(74) *Attorney, Agent, or Firm* — Oliff PLC

(57) ABSTRACT

A light source device according to the present disclosure includes a first light source configured to emit a first light flux, a second light source configured to emit a second light flux, a third light source configured to emit a third light flux, a first light combiner configured to enlarge a first light flux width of the first light flux, and combine the first light flux and the second light flux to generate a first combined light flux, and a second light combiner configured to combine the first combined light flux and the third light flux with each other to generate a second combined light flux. The first light flux width is equal to a second light flux width of the second light flux or smaller than the second light flux width, and the first light flux width is smaller than a third light flux width.

12 Claims, 7 Drawing Sheets

LIGHT SOURCE DEVICE AND PROJECTOR

The present application is based on, and claims priority from JP Application Serial Number 2022-167782, filed Oct. 19, 2022, the disclosure of which is hereby incorporated by reference herein in its entirety.

BACKGROUND

1. Technical Field

The present disclosure relates to a light source device and a projector.

2. Related Art

As an illumination device used in, for example, a projector, there has been proposed an illumination device using a laser source and a phosphor. In JP-A-2013-65414 (Document 1), there is disclosed a projection device provided with an illumination optical system having a blue laser source, a red laser source, and a green phosphor, liquid crystal panels for respectively modulating the blue light, the red light, and the green light from the illumination optical system, and a projection optical system. In this projection device, the blue light from the blue laser source is branched by a half mirror, and a part of the blue light thus branched enters the liquid crystal panel for the blue light, and the rest thereof enters the green phosphor as excitation light. The green fluorescence generated by the green phosphor enters the liquid crystal panel for the green light. The red light from the red laser source enters the liquid crystal panel for the red light.

In the projection device of Document 1, the green light consisting of the fluorescence has a Lambertian light distribution. Therefore, a light flux width of the green light is larger than light flux widths of the red light and the blue light consisting of the laser beams. Further, since the blue laser source and the red laser source are different in output power from each other, in order to achieve the light intensity balance, it is necessary to make the number of the laser sources different therebetween. As a result, the light flux width of the red light and the light flux width of the blue light are different from each other. When converging the colored light beams different in light flux width from each other, and irradiating the display panel with the colored light beams thus converged to project an image as described above, there is a problem that color unevenness occurs.

SUMMARY

In view of the problems described above, the light source device according to an aspect of the present disclosure includes a first light source part configured to emit a first light flux in a first wavelength band, a second light source part configured to emit a second light flux in a second wavelength band different from the first wavelength band, a third light source part configured to emit a third light flux in a third wavelength band different from the first wavelength band and the second wavelength band, a first light combiner configured to enlarge a light flux width of the first light flux, and combine the first light flux and the second light flux with each other to generate a first combined light flux, and a second light combiner configured to combine the first combined light flux and the third light flux with each other to generate a second combined light flux. The light flux width of the first light flux is the same as a light flux width of the second light flux or smaller than the light flux width of the second light flux, and the light flux width of the first light flux is smaller than a light flux width of the third light flux. The first light combiner is configured to make a light flux width of the first light flux emitted from the first light combiner larger than a light flux width of the first light flux entering the first light combiner so as to approximate the light flux width of the first light flux emitted from the first light combiner to at least one of the light flux width of the second light flux and the light flux width of the third light flux.

A light source device according to another aspect of the present disclosure includes a first light source part configured to emit a first light flux in a first wavelength band, a second light source part configured to emit a second light flux in a second wavelength band different from the first wavelength band, a third light source part configured to emit a third light flux in a third wavelength band different from the first wavelength band and the second wavelength band, a first light combiner configured to enlarge light flux widths of the first light flux and the second light flux, and emit a first combined light flux obtained by combining the first light flux, the second light flux, and the third light flux with each other, and a second light combiner configured to make a second combined light flux obtained by combining a part of the first light flux, a part of the second light flux, and a part of the third light flux with each other enter the first light combiner, wherein the light flux width of the first light flux emitted from the first light source part is same as the light flux width of the second light flux emitted from the second light source part, the light flux width of the first light flux emitted from the first light source part and the light flux width of the second light flux emitted from the second light source part are smaller than a light flux width of the third light flux emitted from the third light source part, the second light combiner is configured to transmit the part of the first light flux and the part of the second light flux to make the part of the first light flux and the part of the second light flux enter the first light combiner, and reflect the part of the third light flux to make the part of the third light flux enter the first light combiner, and the first light combiner is configured to make a light flux width of the first light flux and a light flux width of the second light flux emitted from the first light combiner larger than a light flux width of the first light flux and a light flux width of the second light flux entering the first light combiner so as to approximate the light flux width of the first light flux and the light flux width of the second light flux emitted from the first light combiner to the light flux width of the third light flux emitted from the first light combiner, and combine another part of the first light flux, another part of the second light flux, another part of the third light flux, and the second combined light flux with each other to generate the first combined light flux.

A projector according to an aspect of the present disclosure includes the light source device according to one of the aspects of the present disclosure, a light modulation device configured to modulate light including the second combined light flux emitted from the light source device in accordance with image information, and a projection optical device configured to project the light modulated by the light modulation device.

BRIEF DESCRIPTION OF THE DRAWINGS

FIG. 6 is a schematic configuration diagram of a light source device according to a second embodiment.

FIG. 7 is a schematic configuration diagram of a light source device according to a third embodiment.

FIG. 8 is a schematic configuration diagram of a light source device according to a fourth embodiment.

DESCRIPTION OF EXEMPLARY EMBODIMENTS

First Embodiment

A first embodiment of the present disclosure will hereinafter be described using FIG. 1 through FIG. 5.

A projector according to the present embodiment is an example of a liquid crystal projector equipped with a light source device using a semiconductor laser.

It should be noted that in each of the drawings described below, the constituents are shown with the scale ratios of respective sizes set differently between the constituents in some cases in order to make each of the constituents eye-friendly.

A projector 10 according to the present embodiment is a projection-type image display device for displaying a color image on a screen (a projection target surface) SCR. The projector 10 is provided with three light modulation devices corresponding to light fluxes of the respective colors, namely a red light flux LR, a green light flux LG, and a blue light flux LB.

Figure 1:
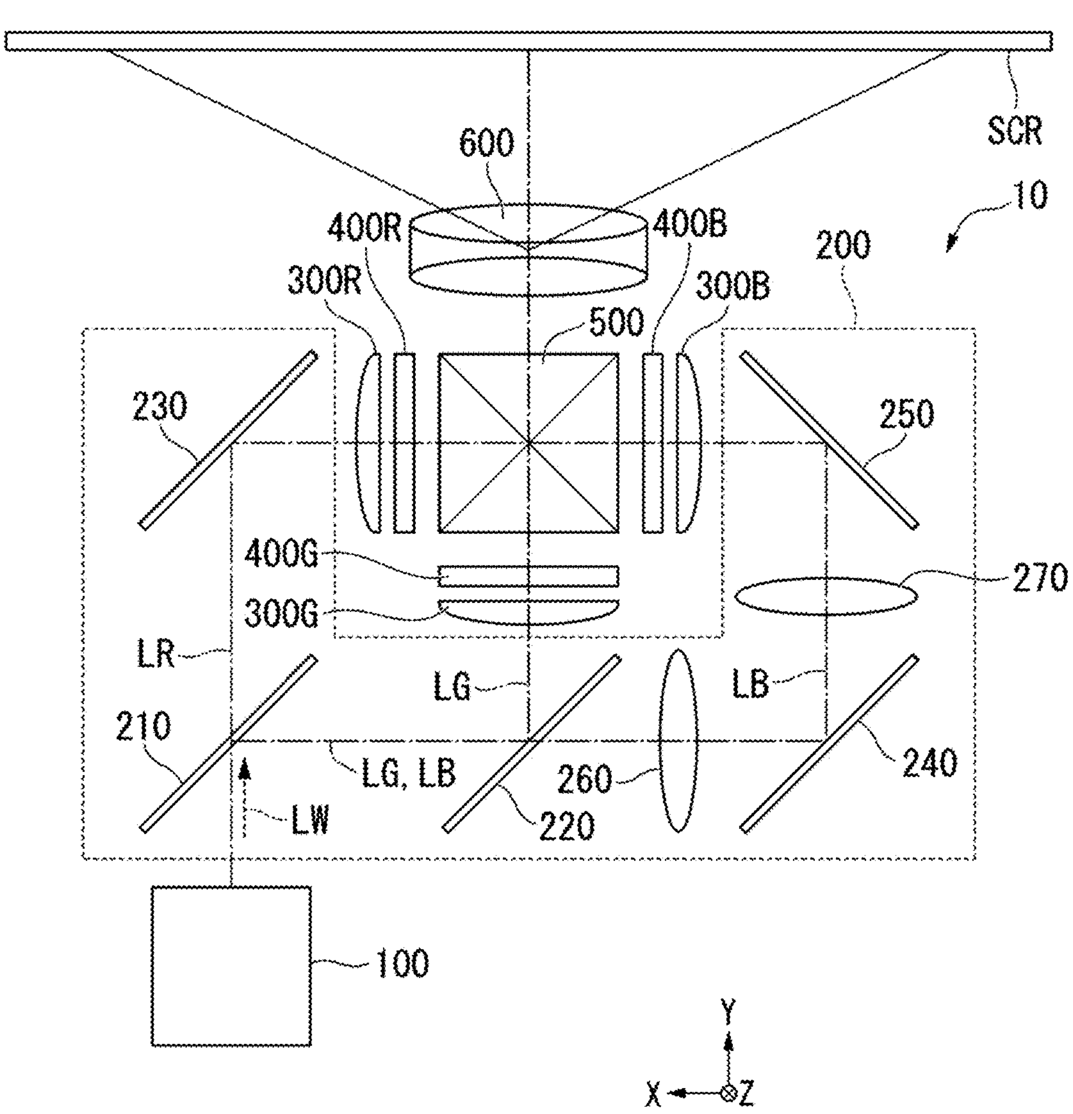
FIG. 1 is a schematic configuration diagram of a projector according to a first embodiment.

FIG. 1 is a schematic configuration diagram of the projector 10 according to the present embodiment.

As shown in FIG. 1, the projector 10 is provided with a light source device 100, a color separation light guide optical system 200, a red-light light modulation device 400R, a green-light light modulation device 400G, a blue-light light modulation device 400B, a cross dichroic prism 500, and a projection optical device 600.

In the present embodiment, the light source device 100 emits second combined light flux LW having a white color including the red light flux LR, the green light flux LG, and the blue light flux LB. A specific configuration of the light source device 100 will be described later.

The color separation light guide optical system 200 is provided with a dichroic mirror 210, a dichroic mirror 220, a reflecting mirror 230, a reflecting mirror 240, a reflecting mirror 250, a relay lens 260, and a relay lens 270. The color separation optical system 200 separates the second combined light flux LW emitted from the light source device 100 into the red light flux LR, the green light flux LG, and the blue light flux LB, then guides the red light flux LR to the red-light light modulation device 400R, guides the green light flux LG to the green-light light modulation device 400G, and guides the blue light flux LB to the blue-light light modulation device 400B.

Between the color separation light guide optical system 200 and the red-light light modulation device 400R, there is disposed a field lens 300R. Between the color separation light guide optical system 200 and the green-light light modulation device 400G, there is disposed a field lens 300G. Between the color separation light guide optical system 200 and the blue-light light modulation device 400B, there is disposed a field lens 300B.

The dichroic mirror 210 transmits the red light component, and reflects the green light component and the blue light component. The dichroic mirror 220 reflects the green light component while transmitting the blue light component. The reflecting mirror 230 reflects the red light component. The reflecting mirror 240 and the reflecting mirror 250 each reflect the blue light component.

Each of the red-light light modulation device 400R, the green-light light modulation device 400G, and the blue-light light modulation device 400B is formed of a liquid crystal panel for modulating the light flux of the corresponding color having entered the light modulation device in accordance with image information to form an image.

Although the illustration is omitted, between the field lens 300R and the red-light light modulation device 400R, between the field lens 300G and the green-light light modulation device 400G, and between the field lens 300B and the blue-light light modulation device 400B, there are respectively arranged incident-side polarization plates. Further, between the red-light light modulation device 400R and the cross dichroic prism 500, between the green-light light modulation device 400G and the cross dichroic prism 500, and between the blue-light light modulation device 400B and the cross dichroic prism 500, there are respectively arranged exit-side polarization plates.

The cross dichroic prism 500 combines the image light emitted from the red-light light modulation device 400R, the image light emitted from the green-light light modulation device 400G, and the image light emitted from the blue-light light modulation device 400B with each other to form a color image. The cross dichroic prism 500 has a substantially rectangular planar shape formed of four rectangular prisms bonded to each other, and has a configuration in which dielectric multilayer films are disposed on substantially X-shaped interfaces on which the rectangular prisms are bonded to each other.

The color image emitted from the cross dichroic prism 500 is projected by the projection optical system 600 on a projection target surface such as the screen SCR in an enlarged manner. The projection optical device 600 is constituted by a plurality of lenses.

Figure 2:
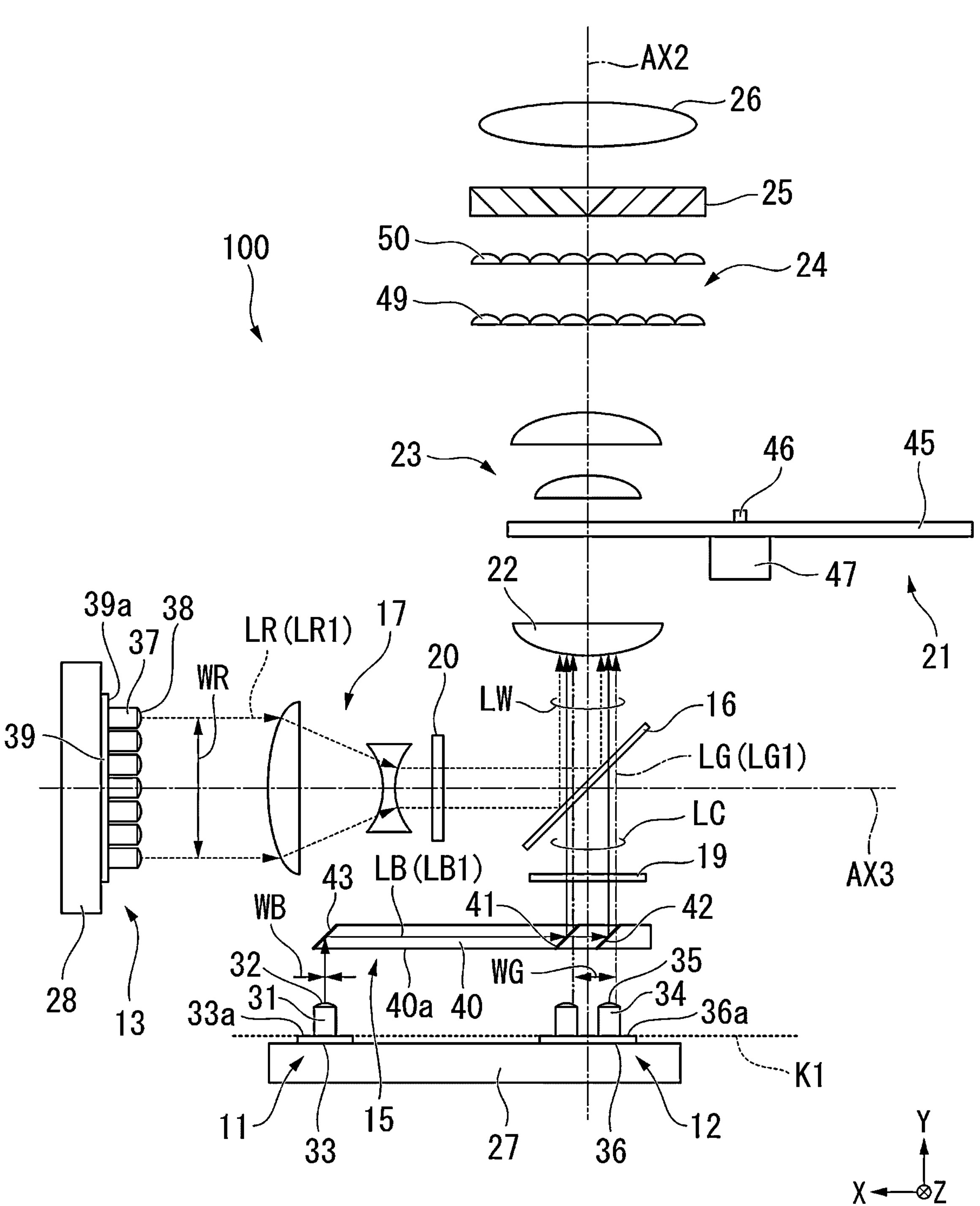
FIG. 2 is a schematic configuration diagram of a light source device according to the first embodiment.

FIG. 2 is a schematic configuration diagram of the light source device 100.

In the following description, there is used an XYZ orthogonal coordinate system as coordinate axes. A direction in which the second combined light flux LW is emitted from the light source device 100 is defined as a positive direction of the Y axis, a direction in which the red light flux LR is emitted from a third light source part 13 described later is defined as a negative direction of the X axis, and a direction from a front side toward aback side of the sheet, and perpendicular to the X axis and the Y axis is defined as a positive direction of the Z axis.

The light source device 100 according to the present embodiment is provided with a first light source part 11, a second light source part 12, the third light source part 13, a first light combiner 15, a second light combiner 16, a light flux width reduction element 17, a first diffuser plate 19, a second diffuser plate 20, a diffusion device 21, a light collection element 22, a pickup element 23, an integrator optical element 24, a polarization conversion element 25, a superimposing lens 26, a first heatsink 27, and a second heatsink 28.

The first light source part 11 is provided with first light emitting elements 31, collimator lenses 32, and a first substrate 33. The first light emitting elements 31 are each formed of a blue semiconductor laser for emitting a blue light beam LB1 as linearly-polarized light. The first light emitting elements 31 each emit the blue light beam LB1 in a first wavelength band toward the +Y direction. The first wavelength band is a blue wavelength band of, for example, 455 nm±10 nm.

The collimator lenses 32 are disposed at the light exit side of the respective first light emitting elements 31. The collimator lenses 32 are each formed of a single convex lens disposed so as to correspond to the first light emitting element 31. The collimator lenses 32 each collimate the blue light beam LB1 emitted from corresponding one of the first light emitting elements 31.

The first substrate 33 has a first surface 33*a* for supporting the first light emitting elements 31. In other words, the first light emitting elements 31 are supported by the first substrate 33. The first surface 33*a* extends in parallel to an X-Z plane. In FIG. 2, there is shown a single first light emitting element 31, but in reality, a plurality of first light emitting elements 31, for example, four first light emitting elements 31, are arranged in a row in a direction (the Z-axis direction) perpendicular to the sheet. It should be noted that the number of the first light emitting elements 31 is not particularly limited. Therefore, the first light source part 11 emits the blue light flux LB including a plurality of the blue light beams LB1. In the present specification, a plurality of light beams emitted from the plurality of light emitting elements is hereinafter referred to as a "light flux" when referring the whole of the plurality of light in a lump.

The blue light flux LB in the present embodiment corresponds to a first light flux in the appended claims.

The second light source part 12 is provided with second light emitting elements 34, collimator lenses 35, and a second substrate 36. The second light emitting elements 34 are each formed of a green semiconductor laser for emitting a green light beam LG1 as linearly-polarized light. The second light emitting elements 34 each emit the green light beam LG1 in a second wavelength band toward the +Y direction. The second wavelength band is a green wavelength band of, for example, 532 nm±10 nm.

The collimator lenses 35 are disposed at the light exit side of the respective second light emitting elements 34. The collimator lenses 35 are each formed of a single convex lens disposed so as to correspond to the second light emitting element 34. The collimator lenses 35 each collimate the green light beam LG1 emitted from corresponding one of the second light emitting elements 34.

The second substrate 36 has a second surface 36*a* for supporting the second light emitting elements 34. In other words, the second light emitting elements 34 are supported by the second substrate 36. The second surface 36*a* extends in parallel to the X-Z plane. In FIG. 2, there are shown two second light emitting elements 34, but in reality, eight second light emitting elements 34, for example, are arranged four by four in two rows in the Z-axis direction. It should be noted that the number of the second light emitting elements 34 is not particularly limited. Therefore, the second light source part 12 emits the green light flux LG including a plurality of the green light beams LG1. A central axis of the green light flux LG emitted from the second light source part 12 is defined as an optical axis AX2.

The green light flux LG in the present embodiment corresponds to a second light flux in the appended claims.

The third light source part 13 is provided with third light emitting elements 37, collimator lens 38, and a third substrate 39. The third light emitting elements 37 are each formed of a red semiconductor laser for emitting a red light beam LR1 as linearly-polarized light. The third light emitting elements 37 each emit the red light beam LR1 in a third wavelength band toward the −X direction. Therefore, the third light emitting elements 37 each emit the red light beam LR1 in a direction perpendicular to the exit directions of the light of the first light emitting element 31 and the light of the second light emitting element 34. The third wavelength band is a red wavelength band of, for example, 640 nm±10 nm.

The collimator lenses 38 are disposed at the light exit side of the respective third light emitting elements 37. The collimator lenses 38 are each formed of a single convex lens disposed so as to correspond to the third light emitting element 37. The collimator lenses 38 each collimate the red light beam LR1 emitted from corresponding one of the third light emitting elements 37.

The third substrate 39 has a third surface 39*a* for supporting the third light emitting elements 37. In other words, the third light emitting elements 37 are supported by the third substrate 39. The third surface 39*a* extends in parallel to a Y-Z plane. In FIG. 2, there are shown seven third light emitting elements 37, but in reality, fourteen third light emitting elements 37, for example, are arranged two by two in seven rows in the Z-axis direction. It should be noted that the number of the third light emitting elements 37 is not particularly limited. Therefore, the third light source part 13 emits the red light flux LR including a plurality of the red light beams LR1. A central axis of the red light flux LR emitted from the third light source part 13 is defined as an optical axis AX3.

The red light flux LR in the present embodiment corresponds to a third light flux in the appended claims.

In the present specification, the light flux width is defined as a length of a side of a rectangle circumscribed on a plurality of colored light located at the outermost circumference when viewing the light fluxes from the central axis direction of that light flux. When the rectangle described above is a square, the light flux width is a length of a side of the square circumscribed on the plurality of colored light located at the outermost circumference. When the rectangle described above is an oblong, the light flux width is a length of a long side or a short side of the oblong circumscribed on the plurality of colored light located at the outermost circumference. For example, in the case of the third light source part 13, when viewed from the central axis direction (the direction of the optical axis AX3) of the red light flux LR, the length of a long side or the length of a short side of the oblong circumscribed on the fourteen red light beams LR1 arranged two by two in the seven rows is adopted. The length of the long side is adopted in the present embodiment, which is described later in detail.

In general, when a laser source is used in all of the blue light source, the green light source, and the red light source, a color gamut of the combined light flux dramatically widens compared to when other light sources than the laser source are used. Since the color gamut of the green color dramatically widens in particular in the three colors, in order to adjust the white balance, it is necessary to increase the light intensity of the red light flux compared to the light intensity of other light fluxes. As an example, the number of the laser sources will be estimated. In general, a luminous efficiency of the laser source, an output per laser source, an efficiency of the optical system, and so on are different by color, and therefore, when performing the estimation taking these into consideration, the numbers of the laser sources required for blue, green, and red are two, ten, and twenty-one, respectively. In this case, the total outputs of the plurality of laser sources of blue, green, and red are 8 W, 10 W, and 32 W, respectively. Here, even when the output per laser source is supposedly the same in value of 4 W in all colors, the numbers of the laser sources required for blue, green, and red are two, three, and eight, respectively. In any case, the number of the laser sources required is the smallest in blue, and the largest in red.

In the case of the present embodiment, the first light source part 11 emits the blue light flux LB consisting of the four blue light beams LB1 emitted from the four first light emitting elements 31. The second light source part 12 emits the green light flux LG consisting of the eight green light beams LG1 emitted from the eight second light emitting elements 34. The third light source part 13 emits the red light flux LR consisting of the fourteen red light beams LR1 emitted from the fourteen third light emitting elements 37. Therefore, the light flux width WB of the blue light flux LB emitted from the first light source part 11 is smaller than the light flux width WG of the green light flux LG emitted from the second light source part 12. The light flux width WG of the green light flux LG emitted from the second light source part 12 is smaller than the light flux width WR of the red light flux LR emitted from the third light source part 13. According to this configuration, it is possible to appropriately adjust the white balance of the second combined light flux LW emitted from the light source device 100.

As described above, since the cross-partal surface of each of the light fluxes has the rectangular shape, the light flux width in a long axis direction and the light flux width in a short axis direction are conceivable as the light flux width. However, when comparing the light flux widths with each other as described above, attention is focused on the light flux width at the side which is superimposed when the three light fluxes are combined with each other. In the present embodiment, attention is focused on the light flux width at the side corresponding to the light flux width in the X-axis direction of the second combined light flux LW. Therefore, the light flux width as the comparison target is the light flux width in the X-axis direction in the blue light flux LB emitted from the first light source part 11 and the green light flux LG emitted from the second light source part 12, or the light flux width in the Y-axis direction in the red light flux LR emitted from the third light source part 13.

The first light combiner 15 is provided with a light guide part 40, a first reflector 41, a second reflector 42, and a third reflector 43. In the case of the present embodiment, the first reflector 41, the second reflector 42, and a third reflector 43 are provided to the light guide part 40. In other words, the first light combiner 15 is formed of a single member obtained by integrating the first reflector 41, the second reflector 42, the third reflector 43, and the light guide part 40 with each other.

The light guide part 40 is formed of a light transmissive material such as optical glass or quartz, and has a substantially quadrangular prismatic shape. The light guide part 40 has a plane of incidence of light 40*a* which is opposed to the first light source part 11 and the second light source part 12. The light guide part 40 guides the blue light flux LB between the third reflector 43 and the first reflector 41, and between the first reflector 41 and the second reflector 42.

The first reflector 41 is disposed at a position opposed to the second light emitting elements 34 at a side close to the first light source part 11 of the second light source part 12 in the light guide part 40. The first reflector 41 is disposed in a posture forming an angle of 45 degrees with respect to the plane of incidence of light 40*a*. The first reflector 41 is formed of a dielectric multilayer film disposed inside the light guide part 40. The first reflector 41 transmits a part of the blue light flux LB toward the −X direction, reflects another part of the blue light flux LB toward the +Y direction crossing the −X direction, and transmits the green light flux LG toward the +Y direction. In the case of the present embodiment, the first reflector 41 transmits 50% of the blue light flux LB entering the first reflector 41, and reflects 50% thereof. As described above, the first reflector 41 functions as a half mirror with respect to the blue light flux LB.

The −X direction in the present embodiment corresponds to a first direction in the appended claims. The +Y direction in the present embodiment corresponds to a second direction in the appended claims.

The second reflector 42 is disposed at a position opposed to the second light emitting elements 34 at a side far from the first light source part 11 of the second light source part 12 in the light guide part 40. The second reflector 42 is disposed in a posture which forms an angle of 45 degrees with respect to the plane of incidence of light 40*a*, and which is parallel to the first reflector 41. The second reflector 42 is formed of a dielectric multilayer film disposed inside the light guide part 40 similarly to the first reflector 41. The second reflector 42 reflects the blue light flux LB having been transmitted through the first reflector 41, toward the +Y direction, and transmits the green light flux LG toward the +Y direction. Therefore, the second reflector 42 functions as a blue-reflecting/green-transmitting dichroic mirror.

The third reflector 43 is disposed at a position opposed to the first light emitting elements 31 of the first light source part 11 in the light guide part 40. The third reflector 43 is disposed in a posture which forms an angle of 45 degrees with respect to the plane of incidence of light 40*a*, and which is parallel to the first reflector 41 and the second reflector 42. The third reflector 43 is formed of an end surface of the light guide part 40 formed so as to form an angle of 45 degrees with respect to the plane of incidence of light 40*a*. The third reflector 43 reflects the blue light flux LB emitted from the first light source part 11 using total reflection on the interface between a glass material constituting the light guide part 40 and air to guide the blue light flux LB to the first reflector 41. It should be noted that the third reflector 43 can have a configuration in which a reflecting film is disposed on an end surface of the light guide part 40.

Due to the configuration described hereinabove, the first light combiner 15 divides the blue light flux LB into two light fluxes to thereby increase the light flux width of the blue light flux LB, and at the same time, combines the blue light flux LB and the green light flux LG with each other to generate the first combined light flux LC. The first combined light flux LC is emitted toward the +Y direction from the first light combiner 15. The detailed function of the first light combiner 15 will be described later.

In the case of the present embodiment, since the first light combiner 15 has the first reflector 41 and the second reflector 42 disposed at a distance from each other in the X-axis direction, it is possible to adjust the light flux width WB of the blue light flux LB by changing the distance between the first reflector 41 and the second reflector 42. Further, since the first reflector 41 and the second reflector 42 are integrated with each other with the light guide part 40, it is easy to easily improve the relative positional accuracy between the first reflector 41 and the second reflector 42. Further, according to this configuration, since the support member for supporting the first reflector 41 and the second reflector 42 becomes unnecessary, it is possible to make a contribution to the reduction in size of the light source device 100.

The second light combiner 16 is disposed on the optical axis AX2 between the first light combiner 15 and the diffusion device 21. The second light combiner 16 is arranged at a position where the optical axis AX2 and the optical axis AX3 cross each other in a posture of forming an angle of 45 degrees with each of the optical axis AX2 and the optical axis AX3. The second light combiner 16 is formed of a dichroic mirror which reflects the red light flux LR, and transmits the blue light flux LB and the green light flux LG. Due to the configuration described hereinabove, the second light combiner 16 combines the first combined light flux LC including the blue light flux LB and the green light flux LG, and the red light flux LR with each other to generate the second combined light flux LW. The second combined light flux LW is emitted toward the +Y direction from the second light combiner 16.

The light flux reduction element 17 is disposed on the optical axis AX3 between the third light source part 13 and the second light combiner 16. The light flux width reduction element 17 reduces the light flux width WR of the red light flux LR emitted from the third light source part 13. Specifically, the light flux width reduction element 17 makes the light flux width WR of the red light flux LR emitted from the light flux width reduction element 17 smaller than the light flux width WR of the red light flux LR entering the light flux width reduction element 17 so as to approximate the light flux width WR to the light flux width WG of the green light flux LG. The light flux width reduction element 17 is formed of an afocal optical element. The afocal optical element of the present embodiment is constituted by a single convex lens and a single concave lens, but the number of the lenses is not particularly limited. Since the light flux width reduction element 17 is formed of the afocal optical element, the red light flux LR entering the light flux width reduction element 17 is emitted from the light flux reduction element 17 while being kept in a collimated light flux. Further, since the light flux width reduction element 17 is formed of the afocal optical element, it is possible to simplify the configuration of the light flux width reduction element 17.

Further, since the light flux width reduction element 17 is disposed in an anterior stage of the second light combiner 16, the red light flux LR which has been reduced in light flux width enters the second light combiner 16. According to this configuration, it is possible to reduce the size of the second light combiner 16, and thus, it is possible to reduce the size of the light source device 100.

The first diffuser plate 19 is disposed on the optical axis AX2 between the first light combiner 15 and the second light combiner 16. The first diffuser plate 19 diffuses the first combined light flux LC emitted from the first light combiner 15.

The first diffuser plate 19 in the present embodiment corresponds to a first diffuser in the appended claims.

The second diffuser plate 20 is disposed on the optical axis AX3 between the third light source part 13 and the second light combiner 16. The second diffuser plate 20 diffuses the red light flux LR emitted from the third light source part 13. The second diffuser plate 20 in the present embodiment corresponds to a second diffuser in the appended claims.

The diffusion device 21 is disposed on the optical axis AX2 between the second light combiner 16 and the integrator optical element 24, namely at the light exit side of the second light combiner 16. The diffusion device 21 is provided with a third diffuser plate 45, and a motor 47 for rotating the third diffuser plate 45 centering on a rotary shaft 46. The third diffuser plate 45 diffuses the second combined light flux LW emitted from the second light combiner 16.

The third diffuser plate 45 in the present embodiment corresponds to a third diffuser in the appended claims.

The first diffuser plate 19, the second diffuser plate 20, and the third diffuser plate 45 have respective configurations substantially the same as each other. Although not shown in the drawings, on one surface of these diffuser plates, there is disposed a concavo-convex structure for diffusing the light flux entering the diffuser plate. The concavo-convex structure can be a configuration in which a plurality of recessed parts and protruding parts having irregular shapes and sizes is formed, or can also be a configuration in which a plurality of microlenses is arranged. It should be noted that as other aspects of the diffuser plate, it is possible to use frosted glass, a holographic diffuser, a transparent substrate on which a blast treatment has been performed, a transparent substrate in which a scattering material is dispersed, and so on. These diffuser plates are each formed of a transmissive diffuser plate for diffusing the light flux entering the diffuser plate while transmitting the light flux. It should be noted that the first diffuser plate 19 and the second diffuser plate 20 can be made rotatable similarly to the third diffuser plate 45.

As described above, the light source device 100 according to the present embodiment is provided with the first diffuser plate 19 for diffusing the first combined light flux LC, the second diffuser plate 20 for diffusing the red light flux LR, and the third diffuser plate 45 for diffusing the second combined light flux LW. According to this configuration, since it is possible to homogenize the illuminance distribution of the light flux of each of the colors, it is possible to reduce the color unevenness of the image. Further, since the light flux of each of the colors as coherence light emitted from the semiconductor laser is diffused, it is possible to prevent a speckle noise in the image when applying the light source device 100 to the projector 10. Further, since the second combined light flux LW is diffused by the third diffuser plate 45, the irradiation area with the second combined light flux LW entering the integrator optical element 24 increases, and it is possible to enhance the cumulativeness of the second combined light flux LW in the image formation area of the light modulation device. Thus, it is possible to efficiently suppress the color unevenness of the image.

The light collection element 22 is disposed on the optical axis AX2 between the second light combiner 16 and the third diffuser plate 45. In the case of the present embodiment, the light collection element 22 is formed of a single lens, but the number of the lenses is not particularly limited. The light collection element 22 converges the second combined light flux LW emitted from the second light combiner 16 toward the third diffuser plate 45.

The pickup element 23 is disposed on the optical axis AX2 between the third diffuser plate 45 and the integrator optical element 24. In the case of the present embodiment, the pickup element 23 is constituted by two convex lenses, but the number of the lenses is not particularly limited. The pickup element 23 collimates the second combined light flux LW diffused by the third diffuser plate 45, and then emits the result toward the optical system in the posterior stage.

The integrator optical element 24 is provided with a first multi-lens array 49, and a second multi-lens array 50. The first multi-lens array 49 has a plurality of first lenses for dividing the second combined light flux LW into a plurality of light fluxes.

A lens surface of the first multi-lens array 49, namely a surface of the first lens, and the image formation area of each of the light modulation devices 400R, 400G, and 400B for the respective colored light are conjugated with each other. Therefore, the shape of each of the first lenses is a rectangular shape as a substantially similar shape to the shape of the image formation area of each of the light modulation devices 400R, 400G, and 400B when viewed from the direction of the optical axis AX2. Thus, each of the plurality of light fluxes emitted from the first multi-lens array 49 efficiently enters each of the image formation areas of the light modulation devices 400R, 400G, and 400B.

The second multi-lens array 50 has a plurality of second lenses corresponding respectively to the plurality of first lenses of the first multi-lens array 49. The second multi-lens array 50 forms images of the respective first lenses of the first multi-lens array 49 in the vicinity of each of the image formation areas of the respective light modulation devices 400R, 400G, and 400B in cooperation with the superimposing lens 26.

The second combined light flux LW having been transmitted through the integrator optical element 24 enters the polarization conversion element 25. The polarization conversion element 25 has a configuration in which polarization split films, reflecting films, and wave plates not shown are arranged in an array. The polarization conversion element 25 uniforms the polarization direction of the second combined light flux LW into a predetermined direction. Specifically, the polarization conversion element 25 uniforms the polarization direction of the second combined light flux LW into a direction of a transmission axis of the incident-side polarization plate of each of the light modulation devices 400R, 400G, and 400B.

Thus, the polarization direction of the red light flux LR, the green light flux LG, and the blue light flux LB separated from the second combined light flux LW having been transmitted through the polarization conversion element 25 coincides with the transmission-axis direction of the incident-side polarization plate of each of the light modulation devices 400R, 400G, and 400B. Therefore, the red light flux LR, the green light flux LG, and the blue light flux LB enter the image formation areas of the light modulation devices 400R, 400G, and 400B, respectively, without being absorbed by the incident-side polarization plates, respectively.

The second combined light flux LW having been transmitted through the polarization conversion element 25 enters the superimposing lens 26. The superimposing lens 26 homogenizes the illuminance distribution in the image formation area of each of the light modulation devices 400R, 400G, and 400B as an illumination target area in cooperation with the integrator optical element 24.

In the case of the present embodiment, the first surface 33*a* of the first substrate 33 of the first light source part 11 and the second surface 36*a* of the second substrate 36 of the second light source part 12 are parallel to the X-Z plane, and are arranged on the same imaginary plane K1. The first light source part 11 and the second light source part 12 are disposed on the first heatsink 27 common thereto. The first heatsink 27 releases the heat generated in the first light source part 11 and the second light source part 12 to the outside to cool the first light source part 11 and the second light source part 12. Further, the third surface 39*a* of the third substrate 39 of the third light source part 13 is parallel to the X-Y plane, and is arranged so as to cross the imaginary plane K1 on which the first surface 33*a* and the second surface 36*a* are arranged. The third light source part 13 is disposed on the second heatsink 28. The second heatsink 28 releases the heat generated in the third light source part 13 to the outside to cool the third light source part 13.

As described above, the light source device 100 according to the present embodiment is provided with the third reflector 43 for reflecting the blue light flux LB emitted from the first light source part 11 to guide the blue light flux LB to the first reflector 41.

In the present embodiment, for example, it is possible to arrange the first light source part 11, the second light source part 12, the first light combiner 15, and the first diffuser plate 19 with a shift toward the +Y direction. On this occasion, when viewed along the emission direction (the X-axis direction) of the red light flux LR emitted from the third light source part 13, a light path of the blue light flux LB which has been reflected by the third reflector 43 overlaps the third surface 39*a* of the third substrate 39 of the third light source part 13. According to this configuration, it is possible to prevent the growth in size of the light source device 100 in the extending direction of the third substrate 39 of the third light source part 13 provided with the largest number of light emitting elements.

The behavior of the light emitted from each of the light source parts will hereinafter be described.

The blue light flux LB emitted from the first light source part 11 toward the +Y direction is reflected by the third reflector 43 of the first light combiner 15, proceeds through the light guide part 40 toward the −X direction, and then enters the first reflector 41. 50% of the blue light flux LB entering the first reflector 41 is reflected by the first reflector 41, proceeds toward the +Y direction, and is then emitted from the first light combiner 15. Another 50% of the blue light flux LB is transmitted through the first reflector 41, proceeds toward the −X direction, and then enters the second reflector 42. The blue light flux LB entering the second reflector 42 is reflected by the second reflector 42, proceeds toward the +Y direction, and is then emitted from the first light combiner 15.

As described above, the blue light flux LB emitted from the first light source part 11 is divided by the first light combiner 15 into two blue light fluxes LB, and the two blue light fluxes LB are emitted in parallel to each other toward the +Y direction at an interval between the first reflector 41 and the second reflector 42. Thus, the light flux width WB of the blue light flux LB having been emitted from the first light combiner 15 becomes larger than the light flux width WB of the blue light flux LB which has not entered the first light combiner 15, and becomes substantially the same as the light flux width WG of the green light flux LG.

Further, out of the two rows of the green light fluxes LG emitted toward the +Y direction from the two rows of second light emitting elements 34 of the second light source part 12, the green light flux LG on the left row is transmitted through the first reflector 41, the green light flux LG on the right row is transmitted through the second reflector 42, and then both of the green light fluxes LG are emitted toward the +Y direction from the first light combiner 15. Therefore, the light flux width WG of the green light flux LG emitted from the second light source part 12 hardly changes before and after the green light flux LG is transmitted through the first light combiner 15. As described above, the blue light flux LB and the green light flux LG are combined by the first light combiner 15, and are then emitted from the first light combiner 15 as the first combined light flux LC.

In contrast, the red light flux LR emitted toward the −X direction from the third light source part 13 enters the light flux width reduction element 17. The light flux width reduction element 17 makes the light flux width WR of the red light flux LR emitted from the light flux width reduction element 17 smaller than the light flux width WR of the red light flux LR entering the light flux width reduction element 17 so as to approximate the light flux width WR to the light flux width WG of the green light flux LG. Thus, the light flux width WR of the red light flux LR emitted from the light flux width reduction element 17 becomes substantially the same as the light flux width WG of the green light flux LG.

The first combined light flux LC emitted from the first light combiner 15 is diffused by the first diffuser plate 19, then is transmitted through the second light combiner 16, and then proceeds toward the +Y direction. In contrast, the red light flux LR emitted from the light flux width reduction element 17 is diffused by the second diffuser plate 20, then is reflected by the second light combiner 16, and then proceeds toward the +Y direction. As described above, the first combined light flux LC and the red light flux LR are combined by the second light combiner 16 to turn to the second combined light flux LW having the white color, and then proceeds toward the +Y direction.

The changes in light flux width of the light fluxes of the respective colors will hereinafter be described.

Figures 3, 4, 5:
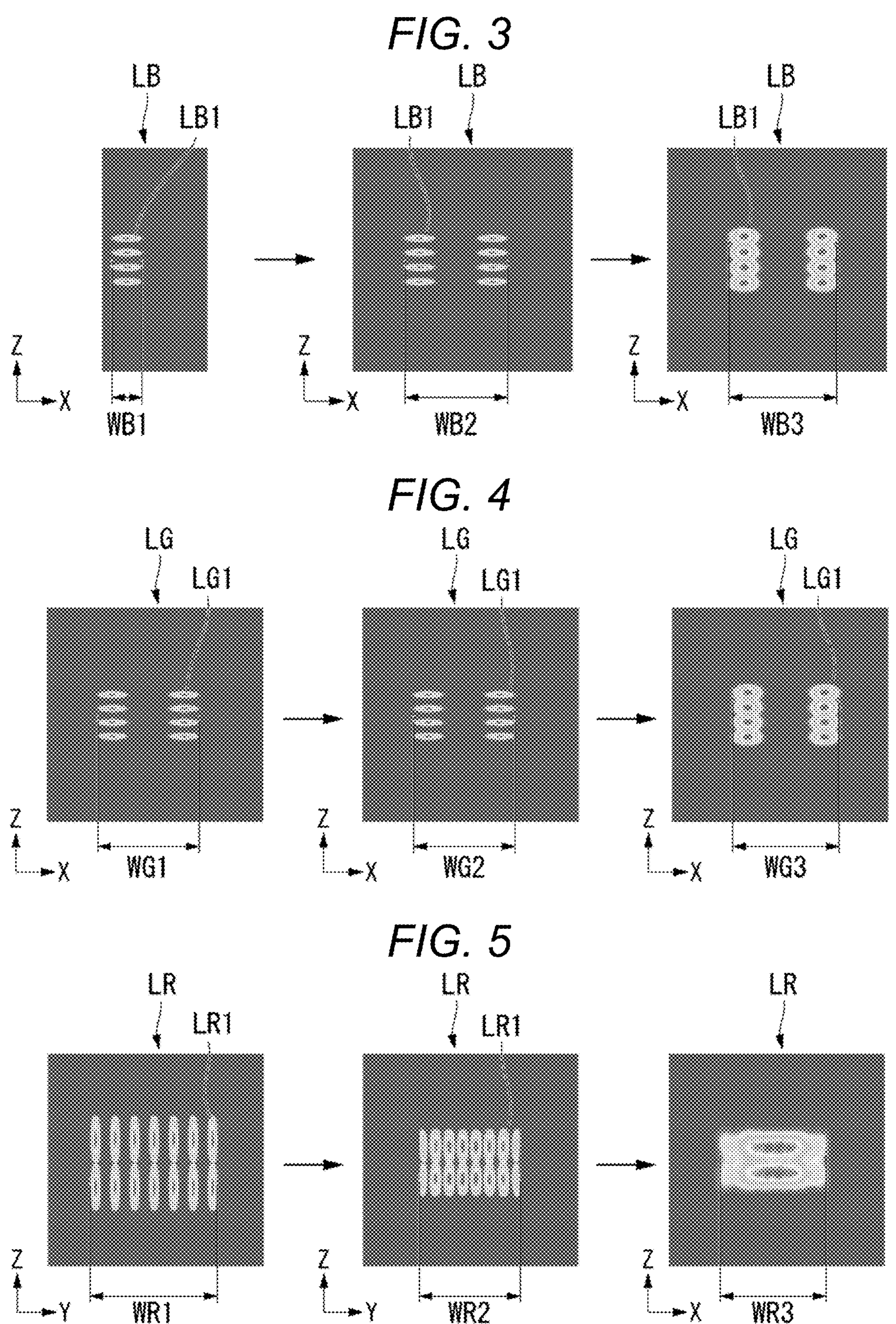
FIG. 3 is a diagram showing an illuminance distribution of a cross-part at a plurality of positions of a blue light flux.
FIG. 4 is a diagram showing an illuminance distribution of a cross-part at a plurality of positions of a green light flux.
FIG. 5 is a diagram showing an illuminance distribution of a cross-part at a plurality of positions of a red light flux.

FIG. 3 is a diagram showing an illuminance distribution of a cross-part at a plurality of positions of the blue light flux LB. FIG. 4 is a diagram showing an illuminance distribution of a cross-part at a plurality of positions of the green light flux LG. FIG. 5 is a diagram showing an illuminance distribution of a cross-part at a plurality of positions of the red light flux LR. In FIG. 3 through FIG. 5, the drawing at the left end shows the cross-part of each of the light fluxes immediately after being emitted from each of the light source parts 11, 12, and 13. The drawing at the center shows the cross-part of each of the light fluxes immediately before entering the first diffuser plate 19 or the second diffuser plate 20. The drawing at the right end shows the cross-part of each of the light fluxes immediately before entering the pickup element 23 after being emitted from the third diffuser plate 45. In FIG. 3 and FIG. 4, the horizontal axis represents length in the X-axis direction, and the vertical axis represents length in the Z-axis direction. Regarding the red light flux LR, since the proceeding direction is deflected as much as 90 degrees before and after entering the second light combiner 16, in the drawings at the left end and the center shown in FIG. 5, the horizontal axis represents the length in the Y-axis direction, and the vertical axis represents the length in the Z-axis direction. In the drawing at the right end, the horizontal axis represents the length in the X-axis direction, and the vertical axis represents the length in the Z-axis direction.

Change in Light Flux Width of Blue Light Flux

As shown in the drawing at the left end in FIG. 3, the blue light flux LB immediately after being emitted from the first light source part 11 has a configuration in which the four blue light beams LB1 are arranged in a row. The light flux width WB1 of the blue light flux LB is the smallest of the three light fluxes. Subsequently, the blue light flux LB is divided by the first light combiner 15 into the two blue light fluxes LB in the X-axis direction, and therefore, the configuration of the blue light flux LB changes to a configuration in which the four blue light beams LB1 are arranged in two rows as shown in the drawing at the center in FIG. 3. Thus, the light flux width of the blue light flux LB increases from WB1 to WB2, and becomes substantially the same as the light flux width WG2 of the green light flux LG. Subsequently, the blue light flux LB is diffused by the third diffuser plate 45, and therefore, becomes in the state in which the illuminance distribution of each of the blue light beams LB1 spreads as shown in the drawing at the right end in FIG. 3. It should be noted that the light flux width WB3 does not significantly change from WB2.

Change in Light Flux Width of Green Light Flux

As shown in the drawing at the left end in FIG. 4, the green light flux LG immediately after being emitted from the second light source part 12 has a configuration in which the eight green light beams LG1 are arranged four by four in two rows. The light flux width WG1 of the green light flux LG is the second smallest of the three light fluxes. The green light flux LG is transmitted through the first light combiner 15, and then directly goes straight, but is not divided unlike the blue light flux LB. Therefore, as shown in the drawing at the center in FIG. 4, the light flux width WG2 of the green light flux LG immediately before entering the first diffuser plate 19 hardly changes from the light flux width WG1 of the green light flux LG immediately after being emitted from the second light source part 12. Subsequently, the green light flux LG is diffused by the third diffuser plate 45, and becomes in the state in which the illuminance distribution of each of the green light beams LG1 spreads as shown in the drawing at the right end in FIG. 4. The light flux width WG3 of the green light flux LG does not significantly change from WG2.

Change in Light Flux Width of Red Light Flux

As shown in the drawing at the left end in FIG. 5, the red light flux LR immediately after being emitted from the third light source part 13 has a configuration in which the fourteen red light beams LR1 are arranged two by two in seven rows. The light flux width WR1 of the red light flux LR is the largest of the three light fluxes. Subsequently, as shown in the drawing at the center in FIG. 5, the light flux width of the red light flux LR is reduced by the light flux width reduction element 17 from WR1 to WR2, and becomes substantially equal to the light flux width WG2 of the green light flux LG. Subsequently, the red light flux LR is diffused by the third diffuser plate 45, and becomes in the state in which the illuminance distributions of the respective red light beams LR1 spread to merge with each other as shown in the drawing at the right end in FIG. 5. The light flux width WR3 of the red light flux LR does not significantly change from WR2.

As described hereinabove, the blue light flux LB, the green light flux LG, and the red light flux LR constituting the second combined light flux LW have the respective light flux widths substantially equal to each other. In FIG. 3 through FIG. 5, the lateral direction (the X-axis direction) corresponds to a lateral direction of the image formation areas of the light modulation devices 400R, 400G, and 400B. The vertical direction (the Z-axis direction) corresponds to a vertical direction of the image formation areas of the light modulation devices 400R, 400G, and 400B. The light flux widths of the blue light flux LB, the green light flux LG, and the red light flux LR can be made equal in either of the lateral direction and the vertical direction, but are desirably made equal in the lateral direction. The reason therefor is that the lateral direction is the direction in which striped light blocking plates of, for example, the polarization conversion element 25 are arranged, and therefore, is higher in influence on a display characteristics than the vertical direction. In the case of the present embodiment, as shown in the drawing at the right end in FIG. 3 through FIG. 5, the light flux widths of the blue light flux LB, the green light flux LG, and the red light flux LR are made equal to each other in both of the lateral direction and the vertical direction, which is the most desirable.

Advantages of First Embodiment

The light source device 100 according to the present embodiment is provided with the first light source part 11 for emitting the blue light flux LB, the second light source part 12 for emitting the green light flux LG, the third light source part 13 for emitting the red light flux LR, the first light combiner 15 which increases the light flux width WB of the blue light flux LB, and at the same time, combines the blue light flux LB and the green light flux LG with each other to generate the first combined light flux LC, the second light combiner 16 for combining the first combined light flux LC and the red light flux LR to generate the second combined light flux LW, and the light flux width reduction element 17 for reducing the light flux width WR of the red light flux LR emitted from the third light source part 13. The light flux width WB of the blue light flux LB is smaller than the light flux width WG of the green light flux LG, and is smaller than the light flux width WR of the red light flux LR. The first light combiner 15 makes the light flux width WB of the blue light flux LB emitted from the first light combiner 15 larger than the light flux width WB of the blue light flux LB entering the first light combiner 15 so as to approximate the light flux width WB to the light flux width WG of the green light flux LG. The light flux width reduction element 17 makes the light flux width WR of the red light flux LR emitted from the light flux width reduction element 17 smaller than the light flux width WR of the red light flux LR entering the light flux width reduction element 17 so as to approximate the light flux width WR to the light flux width WG of the green light flux LG.

According to this configuration, it is possible to substantially uniform the light flux width WB of the blue light flux LB, the light flux width WG of the green light flux LG, and the light flux width WR of the red light flux LR. Thus, when applying the light source device 100 to the projector 10, it is possible to suppress the color unevenness of the image. Further, since the first light combiner 15 is provided with both of the function of dividing the blue light flux LB and the function of combining the blue light flux LB and the green light flux LG with each other, it is possible to achieve reduction in the number of components to reduce the size of the light source device 100.

In particular in the case of the present embodiment, the light flux width WG of the blue light flux LB, which is the smallest, is made to fit the light flux width WG of the green light flux LG, and the light flux width WR of the red light flux LR, which is the largest, is made to fit the light flux width WG of the green light flux LG. According to the present configuration, it is possible to efficiently reduce the size of the light source device 100. The reason therefor is that when supposedly making the light flux widths of the green light flux LG and the red light flux LR fit the light flux width of the blue light flux LB, which is the smallest, it is necessary to elongate the light path length of the afocal optical element constituting the light flux width reduction element 17, and thus, it becomes difficult to reduce the size of the light source device 100. Further, when supposedly making the light flux widths of the blue light flux LB and the green light flux LG fit the light flux width of the red light flux LR, which is the largest, since the light flux width of the second combined light flux LW finally emitted becomes large, the light source device 100 grows in size as a whole.

The projector 10 according to the present embodiment is provided with the light source device 100 according to the present embodiment, the light modulation devices 400R, 400G, and 400B for modulating the light including the second combined light flux LW emitted from the light source device 100 in accordance with the image information, and the projection optical device 600 for projecting the light modulated by the light modulation devices 400R, 400G, and 400B.

According to this configuration, it is possible to provide the projector 10 which is little in color unevenness of the image, and is excellent in display quality.

Second Embodiment

A second embodiment of the present disclosure will hereinafter be described using FIG. 6.

A projector according to the second embodiment is substantially the same in basic configuration as that of the first embodiment, but is different in configuration of the light source device from that of the first embodiment. Therefore, the description of the basic configuration of the projector will be omitted.

Figure 6:
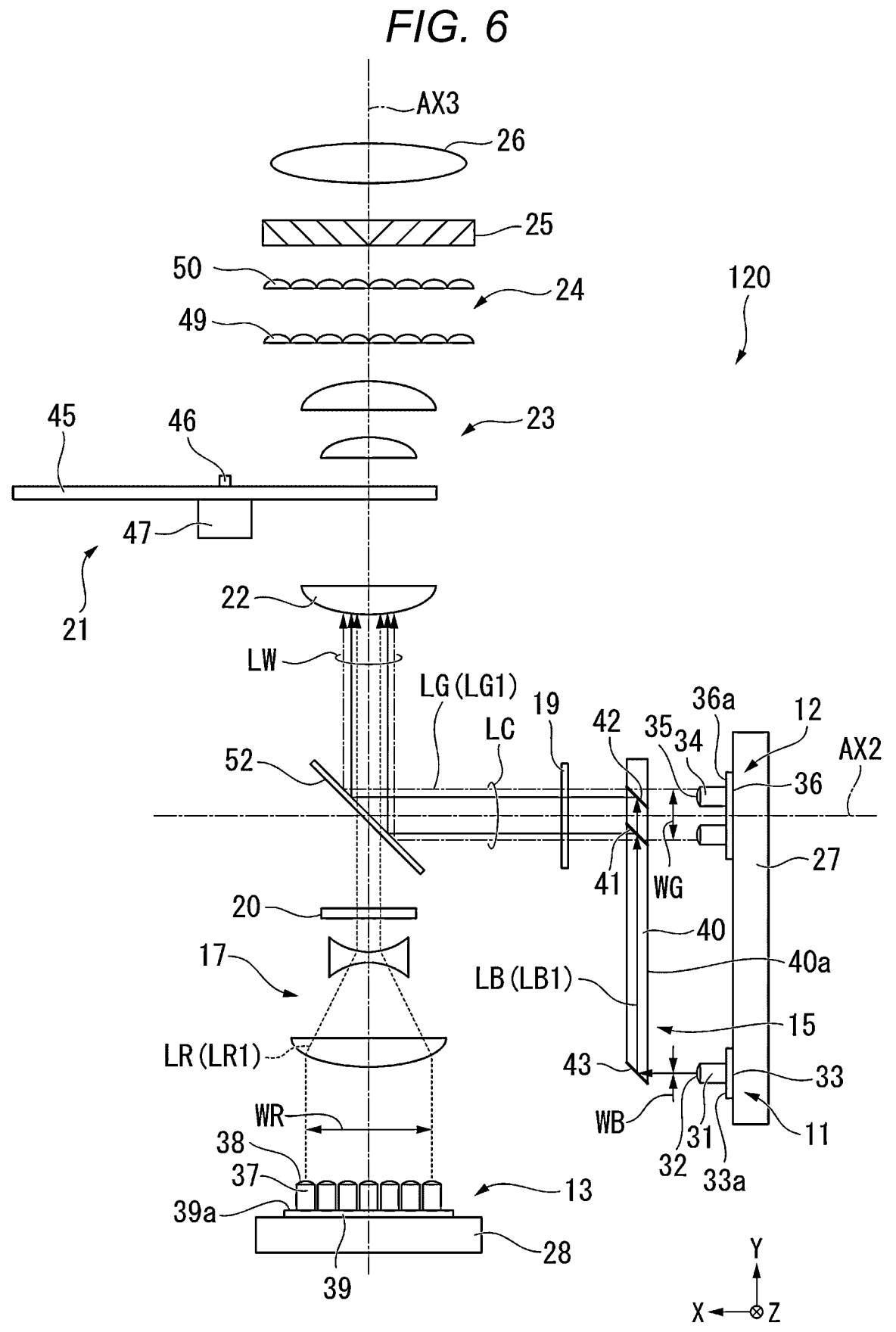

FIG. 6 is a schematic configuration diagram of a light source device 120 according to the second embodiment.

In FIG. 6, the constituents common to FIG. 2 used in the first embodiment are denoted by the same reference symbols, and the description thereof will be omitted.

As shown in FIG. 6, the light source device 120 according to the present embodiment is provided with the first light source part 11, the second light source part 12, the third light source part 13, the first light combiner 15, a second light combiner 52, the light flux width reduction element 17, the first diffuser plate 19, the second diffuser plate 20, the diffusion device 21, the light collection element 22, the pickup element 23, the integrator optical element 24, the polarization conversion element 25, the superimposing lens 26, the first heatsink 27, and the second heatsink 28.

In the present embodiment, an arrangement of the optical elements is different from that in the first embodiment. The second light source part 12, the first light combiner 15, the first diffuser plate 19, and the second light combiner 52 are disposed on the optical axis AX2. The third light source part 13, the light flux width reduction element 17, the second diffuser plate 20, the second light combiner 52, the light collection element 22, the diffusion device 21, the pickup element 23, the integrator optical element 24, the polarization conversion element 25, and the superimposing lens 26 are disposed on the optical axis AX3.

The second light combiner 52 in the present embodiment has an opposite optical characteristic to that of the second light combiner 16 in the first embodiment. Specifically, the second light combiner 52 is formed of a dichroic mirror which reflects the blue light flux LB and the green light flux LG, and transmits the red light flux LR. The second light combiner 52 combines the first combined light flux LC including the blue light flux LB and the green light flux LG, and the red light flux LR with each other to generate the second combined light flux LW. The rest of the configuration of the light source device 120 is substantially the same as in the first embodiment.

Advantages of Second Embodiment

Also in the present embodiment, there can be obtained substantially the same advantage as in the first embodiment such as the advantage that it is possible to realize the light source device 120 which is small in size and capable of suppressing the color unevenness of the image.

Third Embodiment

A third embodiment of the present disclosure will hereinafter be described using FIG. 7.

A projector according to the third embodiment is substantially the same in basic configuration as that of the first embodiment, but is different in configuration of the light source device from that of the first embodiment. Therefore, the description of the basic configuration of the projector will be omitted.

Figure 7:
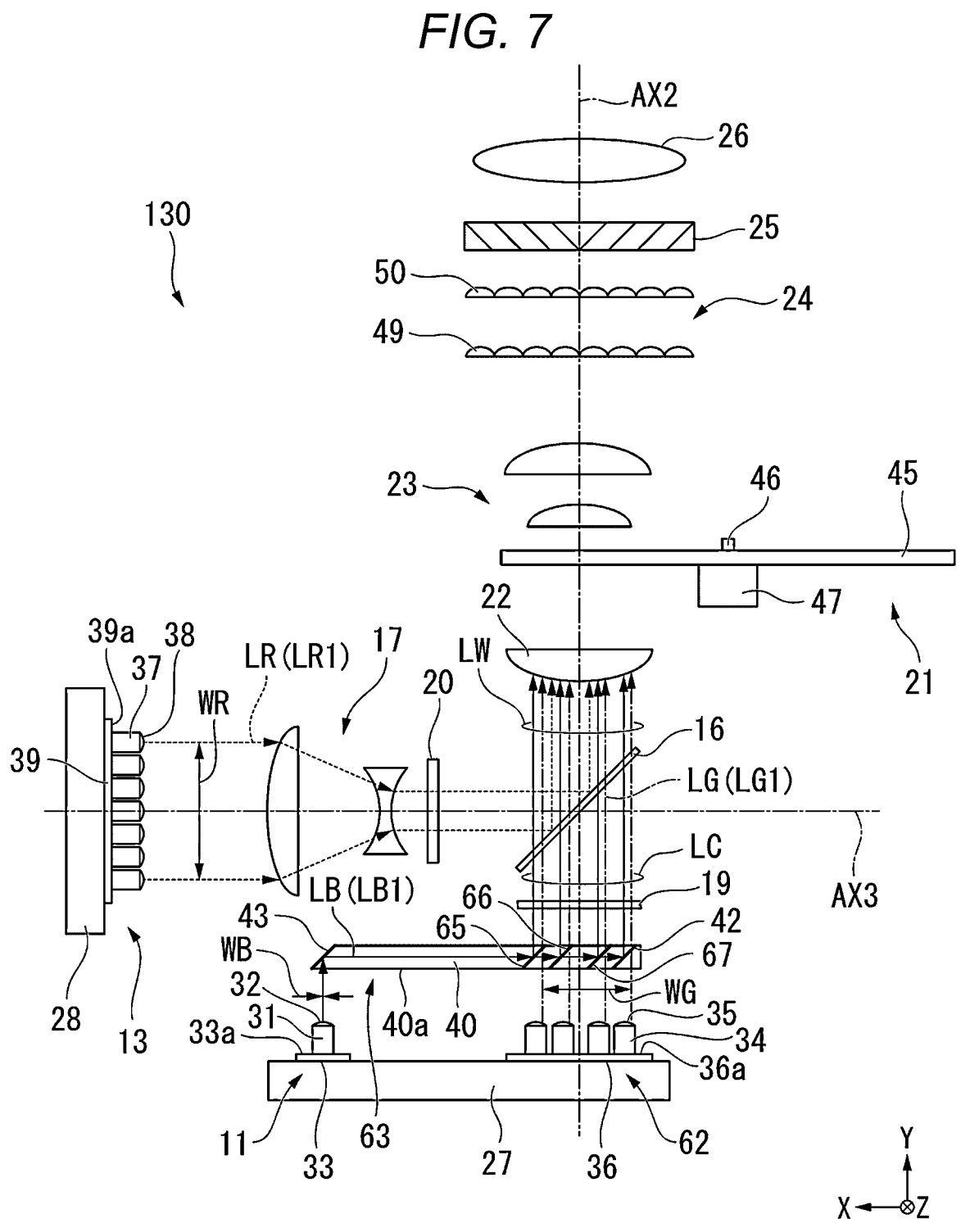

FIG. 7 is a schematic configuration diagram of a light source device 130 according to the third embodiment.

In FIG. 7, the constituents common to FIG. 2 used in the first embodiment are denoted by the same reference symbols, and the description thereof will be omitted.

As shown in FIG. 7, the light source device 130 according to the present embodiment is provided with the first light source part 11, a second light source part 62, the third light source part 13, a first light combiner 63, the second light combiner 16, the light flux width reduction element 17, the first diffuser plate 19, the second diffuser plate 20, the diffusion device 21, the light collection element 22, the pickup element 23, the integrator optical element 24, the polarization conversion element 25, the superimposing lens 26, the first heatsink 27, and the second heatsink 28.

In the case of the present embodiment, the first light combiner 63 is provided with the light guide part 40, a first reflector 65, the second reflector 42, the third reflector 43, a fourth reflector 66, and a fifth reflector 67. Further, the plurality of second light emitting elements 34 of the second light source part 62 is arranged in four rows with intervals in the X-axis direction.

In the first light combiner 63, the first reflector 65 is disposed at a position opposed to the second light emitting elements 34 in the first row from the first light source part 11 side. The first reflector 65 transmits a part of the blue light flux LB toward the −X direction, reflects another part of the blue light flux LB toward the +Y direction crossing the −X direction, and transmits the green light flux LG toward the +Y direction. In the case of the present embodiment, the first reflector 65 reflects 25% of the blue light flux LB entering the first reflector 65, and transmits 75% thereof.

The fourth reflector 66 is disposed at a position opposed to the second light emitting elements 34 in the second row from the first light source part 11 side. The fourth reflector 66 transmits a part of the blue light flux LB transmitted through the first reflector 65 toward the −X direction, reflects another part of the blue light flux LB toward the +Y direction crossing the −X direction, and transmits the green light flux LG toward the +Y direction. In the case of the present embodiment, the fourth reflector 66 reflects 34% of the blue light flux LB entering the fourth reflector 66, and transmits 66% thereof.

The fifth reflector 67 is disposed at a position opposed to the second light emitting elements 34 in the third row from the first light source part 11 side. The fifth reflector 67 transmits a part of the blue light flux LB transmitted through the fourth reflector 66 toward the −X direction, reflects another part of the blue light flux LB toward the +Y direction crossing the −X direction, and transmits the green light flux LG toward the +Y direction. In the case of the present embodiment, the fifth reflector 67 reflects 50% of the blue light flux LB entering the fifth reflector 67, and transmits 50% thereof.

The second reflector 42 is disposed at a position opposed to the second light emitting elements 34 in the fourth row from the first light source part 11 side. The second reflector 42 reflects the blue light flux LB having been transmitted through the fifth reflector 67, toward the +Y direction, and transmits the green light flux LG toward the +Y direction.

In this manner, the first reflector 65, the fourth reflector 66, and the fifth reflector 67 are common in the point of reflecting a part of the blue light flux LB entering that reflector and transmitting another part thereof, but are different in reflection rate as described above. Therefore, 25% of the blue light flux LB entering the first reflector 65 is reflected by the first reflector 65, and is emitted therefrom toward the +Y direction. 25% (=75%×34%) of the blue light flux LB entering the first reflector 65 is reflected by the fourth reflector 66, and is emitted therefrom toward the +Y direction. 25% (=75%×66%×50%) of the blue light flux LB entering the first reflector 65 is reflected by the fifth reflector 67, and is emitted therefrom toward the +Y direction. 25% (=75%×66%×50%) of the blue light flux LB entering the first reflector 65 is reflected by the second reflector 42, and is emitted therefrom toward the +Y direction. In this manner, the blue light flux LB emitted from the first light source part 11 is divided by the first light combiner 63 into the four equal light fluxes. Further, the light flux width WB of the blue light flux LB divided into the four light fluxes becomes substantially equal to the light flux width WG of the green light flux LG. The rest of the configuration of the light source device 130 is substantially the same as in the first embodiment.

Advantages of Third Embodiment

Also in the present embodiment, there can be obtained substantially the same advantage as in the first embodiment such as the advantage that it is possible to realize the light source device 130 which is small in size and capable of suppressing the color unevenness of the image.

Fourth Embodiment

A fourth embodiment of the present disclosure will hereinafter be described using FIG. 8.

A projector according to the fourth embodiment is substantially the same in basic configuration as that of the first embodiment, but is different in the configuration of the light source device from that of the first embodiment. Therefore, the description of the basic configuration of the projector will be omitted.

Figure 8:
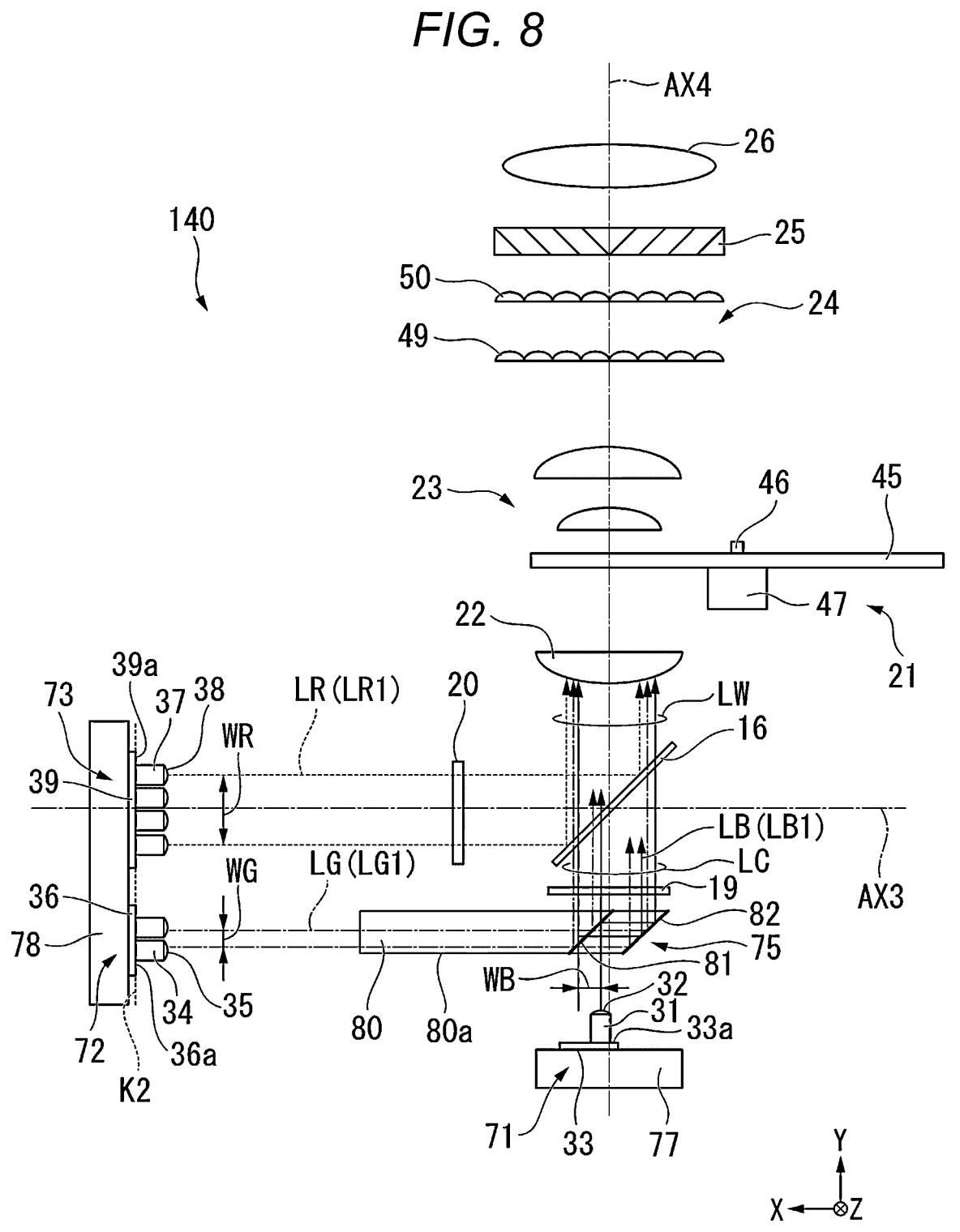

FIG. 8 is a schematic configuration diagram of a light source device 140 according to the fourth embodiment.

In FIG. 8, the constituents common to FIG. 2 used in the first embodiment are denoted by the same reference symbols, and the description thereof will be omitted.

As shown in FIG. 8, the light source device 140 according to the present embodiment is provided with a first light source part 71, a second light source part 72, a third light source part 73, a first light combiner 75, the second light combiner 16, the first diffuser plate 19, the second diffuser plate 20, the diffusion device 21, the light collection element 22, the pickup element 23, the integrator optical element 24, the polarization conversion element 25, the superimposing lens 26, a first heatsink 77, and a second heatsink 78.

In the present embodiment, an arrangement of the optical elements is different from that in the first embodiment. The first light source part 71, the first light combiner 75, the first diffuser plate 19, the second light combiner 16, the light collection element 22, the diffusion device 21, the pickup element 23, the integrator optical element 24, the polarization conversion element 25, and the superimposing lens 26 are disposed on an optical axis AX4. It should be noted that a central axis of the second combined light flux LW emitted from the second light combiner 16 is defined as the optical axis AX4. The third light source part 73, the second diffuser plate 20, and the second light combiner 16 are disposed on the optical axis AX2.

The first light source part 71 is provided with the plurality of first light emitting elements 31 arranged in two rows at a distance in the X-axis direction from each other. The second light source part 72 is provided with the plurality of second light emitting elements 34 arranged in two rows at a distance in the Y-axis direction from each other. The third light source part 73 is provided with the plurality of third light emitting elements 37 arranged in four rows at intervals in the Y-axis direction. Therefore, in the case of the present embodiment, the light flux width WB of the blue light flux LB emitted from the first light source part 71 is substantially the same as the light flux width WG of the green light flux LG emitted from the second light source part 72. The light flux width WB of the blue light flux LB emitted from the first light source part 71 is smaller than the light flux width WR of the red light flux LR emitted from the third light source part 73.

In the case of the first embodiment, the first surface 33*a* of the first substrate 33 of the first light source part 11 and the second surface 36*a* of the second substrate 36 of the second light source part 12 are arranged on the same imaginary plane K1, and the third surface 39*a* of the third substrate 39 of the third light source part 13 is arranged so as to cross the imaginary plane K1. In contrast, in the case of the present embodiment, the second surface 36*a* of the second substrate 36 of the second light source part 72 and the third surface 39*a* of the third substrate 39 of the third light source part 73 are parallel to the Y-Z plane, and are arranged on the same imaginary plane K2. The first surface 33*a* of the first substrate 33 of the first light source part 71 is arranged so as to cross the imaginary plane K2. In other words, in the case of the present embodiment, the second light source part 72 is arranged at the same side as the third light source part 73 but is not arranged at the same side as the first light source part 71 unlike the first embodiment. Therefore, the first light source part 71 is disposed on the first heatsink 77. The second light source part 72 and the third light source part 73 are disposed on the second heatsink 78 common thereto.

The first light combiner 75 is provided with a light guide part 80, a first reflector 81, and a sixth reflector 82. In the present embodiment, unlike the first embodiment, the first light combiner 75 is not provided with the third reflector for deflecting the light path of the blue light flux LB as much as 90 degrees. The end surface of the light guide part 80 is arranged so as to be opposed to the second light emitting elements 34 in the second row of the second light source part 72. Therefore, the green light flux LG emitted from the second light source part 72 proceeds toward the −X direction to enter the first light combiner 75 from the end surface of the light guide part 80.

The first reflector 81 is disposed in a posture forming an angle of 45 degrees with respect to a plane of incidence of light 80*a*. The first reflector 81 reflects apart of the blue light flux LB entering the first reflector 81 toward the −X direction, transmits another part of the blue light flux LB toward the +Y direction, transmits a part of the green light flux LG proceeding toward the −X direction, toward the −X direction, and reflects another part of the green light flux LG toward the +Y direction. In the case of the present embodiment, the first reflector 81 reflects 50% of the blue light flux LB entering the first reflector 81, transmits 50% of the blue light flux LB, reflects 50% of the green light flux LG entering the first reflector 81, and transmits 50% of the green light flux LG. The first reflector 81 functions as a half mirror with respect to both of the blue light flux LB and the green light flux LG.

The sixth reflector 82 is disposed in a posture which is parallel to the first reflector 81, and forms an angle of 45 degrees with respect to the plane of incidence of light 80*a*. The sixth reflector 82 reflects the light flux entering the sixth reflector 82 irrespective of the wavelength band.

Due to the configuration hereinabove described, the blue light flux LB emitted from the first light source part 71 is divided by the first light combiner 75 into two light fluxes, and the two light fluxes are emitted in parallel to each other toward the +Y direction at an interval between the first reflector 81 and the sixth reflector 82. Thus, the light flux width WB of the blue light flux LB emitted from the first light combiner 75 becomes larger than the light flux width WB of the blue light flux LB entering the first light combiner 75. Similarly, the green light flux LG emitted from the second light source part 72 is divided by the first light combiner 75 into two light fluxes, and the two light fluxes are emitted in parallel to each other toward the +Y direction at an interval between the first reflector 81 and the sixth reflector 82. Thus, the light flux width WG of the green light flux LG emitted from the first light combiner 75 becomes larger than the light flux width WG of the green light flux LG entering the first light combiner 75. Thus, the light flux width WB of the blue light flux LB and the light flux width WG of the green light flux LG becomes substantially the same.

Similarly to the first embodiment, the second light combiner 16 is formed of the dichroic mirror which reflects the red light flux LR, and transmits the blue light flux LB and the green light flux LG. Therefore, the second light combiner 16 combines the first combined light flux LC including the blue light flux LB and the green light flux LG, and the red light flux LR with each other to generate the second combined light flux LW. The distance between the first reflector 81 and the sixth reflector 82 of the first light combiner 75 is set substantially the same as the light flux width WR of the red light flux LR. Therefore, each of the light flus width WB of the blue light flux LB and the light flux width WG of the green light flux LG is enlarged by the first light combiner 75 to thereby be uniformed to substantially the same level as the light flux width WR of the red light flux LR. The rest of the configuration of the light source device 140 is substantially the same as in the first embodiment.

Advantages of Fourth Embodiment

Also in the present embodiment, there can be obtained substantially the same advantage as in the first embodiment such as the advantage that it is possible to realize the light source device 140 which is small in size and capable of suppressing the color unevenness of the image.

Fifth Embodiment

A fifth embodiment of the present disclosure will hereinafter be described using FIG. 9.

A projector according to the fifth embodiment is substantially the same in basic configuration as that of the first embodiment, but is different in configuration of the light source device from that of the first embodiment. Therefore, the description of the basic configuration of the projector will be omitted.

Figure 9:
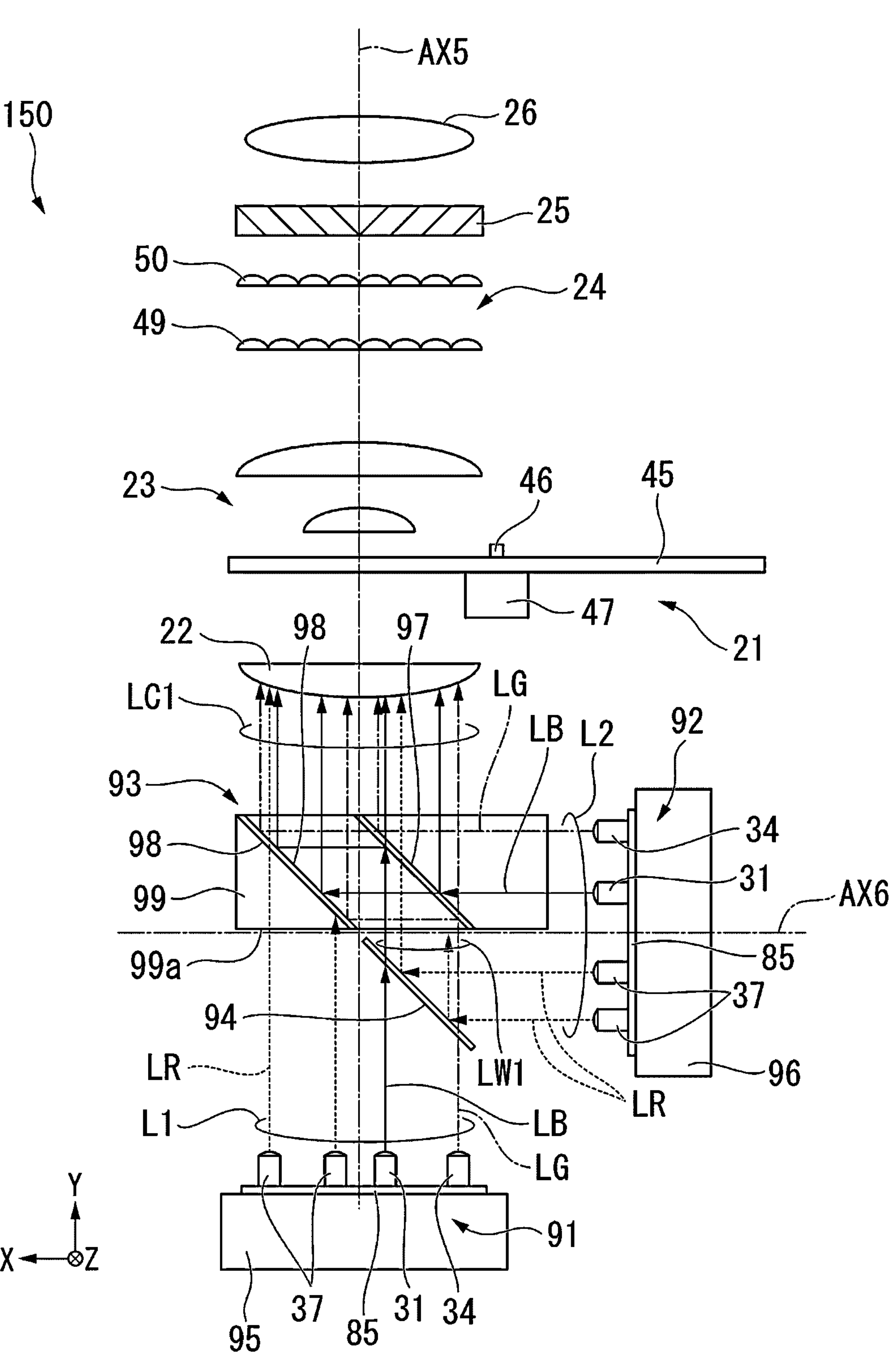
FIG. 9 is a schematic configuration diagram of a light source device according to a fifth embodiment.

FIG. 9 is a schematic configuration diagram of a light source device 150 according to the fifth embodiment.

In FIG. 9, the constituents common to FIG. 2 used in the first embodiment are denoted by the same reference symbols, and the description thereof will be omitted.

As shown in FIG. 9, the light source device 150 according to the present embodiment is provided with a first light source unit 91, a second light source unit 92, a first light combiner 93, a second light combiner 94, the diffusion device 21, the light collection element 22, the pickup element 23, the integrator optical element 24, the polarization conversion element 25, the superimposing lens 26, a first heatsink 95, and a second heatsink 96.

In the first through fourth embodiments, the light emitting elements the same in color are disposed on a single substrate to constitute one light source part for emitting the light flux of a specific color. In contrast, in the present embodiment, the light emitting elements for emitting respective colored light different in color from each other are disposed on a single substrate in a mixed manner to form one light source unit. The first light source unit 91 and the second light source unit 92 have respective configurations the same as each other.

Each of the first light source unit 91 and the second light source unit 92 is provided with the first light emitting elements 31 arranged in a row for emitting the blue light flux LB, the second light emitting elements 34 arranged in a row for emitting the green light flux LG, the third light emitting elements 37 arranged in two rows for emitting the red light flux LR, and a substrate 85 for supporting these light emitting elements. Therefore, in the present embodiment, the first through third light source parts in the first through fourth embodiments are disposed so as to be divided into the two light source units 91, 92. A first pencil L1 including the blue light flux LB, the green light flux LG, and the red light flux LR is emitted toward the +Y direction from the first light source unit 91. A second pencil L2 including the blue light flux LB, the green light flux LG, and the red light flux LR is emitted toward the +X direction from the second light source unit 92. A central axis of the first pencil L1 is defined as an optical axis AX5, and a central axis of the second pencil L2 is defined as an optical axis AX6.

The first light combiner 93 is disposed at a position opposed to the light emitting elements 31, 34, and 37 of the first light source unit 91, and the first light emitting elements 31 and the second light emitting elements 34 of the second light source unit 92. The first light combiner 93 is provided with a light guide part 99, a first reflector 97, and a second reflector 98. The first light combiner 93 enlarges the light flux width of the blue light flux LB and the light flux width of the green light flux LG, and at the same time, emits a first combined light flux LC1 obtained by combining the blue light flux LB, the green light flux LG, and the red light flux LR.

The first reflector 97 is disposed at a position opposed to the first light emitting elements 31 and the second light emitting elements 34 of the first light source unit 91, and the first light emitting elements 31 and the second light emitting elements 34 of the second light source unit 92. The first reflector 97 is disposed in a posture forming an angle of 45 degrees with respect to a plane of incidence of light 99*a*. The first reflector 97 is formed of a dielectric multilayer film disposed inside the light guide part 99. The first reflector 97 transmits a part of the blue light flux LB, reflects another part of the blue light flux LB, transmits a part of the green light flux LG, reflects another part of the green light flux LG, and transmits the red light flux LR. The first reflector 97 transmits 50% of the blue light flux LB and the green light flux LG entering the first reflector 97, and reflects 50% thereof.

As described above, the first reflector 97 functions as a half mirror with respect to the blue light flux LB and the green light flux LG, and at the same time, transmits the red light flux LR.

The second reflector 98 is disposed at a position opposed to the two rows of the third light emitting elements 37 of the first light source unit 91, and the first light emitting elements 31 and the second light emitting elements 34 of the second light source unit 92. The second reflector 98 is disposed in a posture which is parallel to the first reflector 97, and forms an angle of 45 degrees with respect to the plane of incidence of light 99*a*. The second reflector 98 is formed of a dichroic mirror which reflects the blue light flux LB and the green light flux LG, and transmits the red light flux LR.

The second light combiner 94 is disposed at a position opposed to the first light emitting elements 31 and the second light emitting elements 34 of the first light source unit 91, and the two rows of the third light emitting elements 37 of the second light source unit 92. The second light combiner 94 is disposed in parallel to the first reflector 97. The second light combiner 94 is formed of a dichroic mirror which reflects the red light flux LR emitted from the third light emitting elements 37 of the second light source unit 92, and transmits the blue light flux LB emitted from the first light emitting elements 31 of the second light source unit 92 and the green light flux LG emitted from the second light emitting elements 34 of the second light source unit 92.

The blue light flux LB emitted from the first light emitting elements 31 of the first light source unit 91 is transmitted through the second light combiner 94 to enter the first reflector 97 of the first light combiner 93. The green light flux LG emitted from the second light emitting elements 34 of the first light source unit 91 is transmitted through the second light combiner 94 to enter the first reflector 97 of the first light combiner 93. The red light flux LR emitted from the third light emitting elements 37 of the second light source unit 92 is reflected by the second light combiner 94 toward the +Y direction to enter the first reflector 97 of the first light combiner 93.

The second light combiner 94 of the present embodiment makes a second combined light flux LW1, which is obtained by combining a part of the blue light flux LB, a part of the green light flux LG, and a part of the red light flux LR emitted by the first light source unit 91 and the second light source unit 92 with each other, enter the first light combiner 93. It should be noted that a part of the blue light flux LB corresponds to the blue light flux LB emitted from the first light emitting elements 31 in the first light source unit 91, a part of the green light flux LG corresponds to the green light flux LG emitted from the second light emitting elements 34 in the first light source unit 91, and a part of the red light flux LR corresponds to the red light flux LR emitted from the third light emitting elements 37 in the second light source unit 92.

The blue light flux LB emitted from the first light emitting elements 31 and the green light flux LG emitted from the second light emitting elements 34 in the second light source unit 92 enter the first reflector 97 of the first light combiner 93. 50% of the blue light flux LB and the green light flux LG having entered the first reflector 97 is reflected by the first reflector 97 toward the +Y direction. Another 50% of the blue light flux LB and the green light flux LG is transmitted through the first reflector 97 to proceed toward the +X direction, and is then reflected by the second reflector 98 to proceed toward the +Y direction.

50% of the blue light flux LB and the green light flux LG out of the second combined light flux LW1 having entered the first reflector 97 is transmitted through the first reflector 97 to proceed toward the +Y direction. Another 50% of the blue light flux LB and the green light flux LG is reflected by the first reflector 97 to proceed toward the +X direction, and is then reflected by the second reflector 98 to proceed toward the +Y direction.

In such a manner, by each of the blue light flux LB and the green light flux LG being divided by the first reflector 97 of the first light combiner 93 into two light fluxes, the light flux widths of the blue light flux LB and the green light flux LG having been emitted from the first light combiner 93 increase as much as the distance between the first reflector 97 and the second reflector 98 compared to the light flux widths of the blue light flux LB and the green light flux LG which have not entered the first light combiner 93. The red light flux LR emitted from the third light emitting element 37 in the first light source unit 91 is transmitted through the second reflector 98 to proceed toward the +Y direction. Further, the red light flux LR out of the second combined light flux LW1 having entered the first reflector 97 is transmitted through the first reflector 97 to proceed toward the +Y direction.

In such a manner, the first light combiner 93 enlarges the light flux widths of the blue light flux LB and the green light flux LG to uniform the light flux widths to the light flux width of the red light flux LR, and at the same time, combines another part of the blue light flux LB, another part of the green light flux LG, another part of the red light flux LR, and the second combined light flux LW1 with each other to generate a first combined light flux LC1 having a white color, and then emits the first combined light flux LC1 toward the +Y direction.

It should be noted that another part of the blue light flux LB corresponds to the blue light flux LB emitted from the first light emitting elements 31 in the second light source unit 92, another part of the green light flux LG corresponds to the green light flux LG emitted from the second light emitting elements 34 in the second light source unit 92, and another part of the red light flux LR corresponds to the red light flux LR emitted from the third light emitting elements 37 in the first light source unit 91.

Advantages of Fifth Embodiment

Also in the present embodiment, there can be obtained substantially the same advantage as in the first embodiment such as the advantage that it is possible to realize the light source device 150 which is small in size and capable of suppressing the color unevenness of the image. In particular, the configuration of the present embodiment is suitable when using a light source unit provided with three colors of light emitting elements.

It should be noted that the scope of the present disclosure is not limited to the embodiments described above, and a variety of modifications can be provided thereto within the scope or the spirit of the present disclosure. Further, one aspect of the present disclosure can be provided with a configuration obtained by arbitrarily combining characterizing portions of the respective embodiments described above with each other.

For example, the first light combiner is not necessarily required to have a prism-type structure in which the first reflector, the second reflector, and the light guide part are integrated with each other. For example, each of the first reflector and the second reflector can be formed of a plate-type element to be supported by an arbitrary support member, and the first light combiner is not required to have the light guide part.

Besides the above, the specific descriptions of the shape, the number, the arrangement, the material, and so on of the constituents of the light source device and the projector are not limited to those in the embodiment described above, and can arbitrarily be modified. Further, although in the embodiments described above, there is described the example of installing the light source device according to the present disclosure in the projector using the liquid crystal panels, the example is not a limitation. The light source device according to the present disclosure can also be applied to a projector using digital micromirror devices as the light modulation devices. Further, the projector is not required to have a plurality of light modulation devices, and can be a single-panel projector provided with just one light modulation device.

Although in the embodiments described above, there is described the example of applying the light source device according to the present disclosure to the projector, the example is not a limitation. The light source device according to the present disclosure can also be applied to lighting equipment, a headlight of a vehicle, and so on.

Conclusion of Present Disclosure

Hereinafter, the conclusion of the present disclosure will supplementarily be noted.

Supplementary Note 1

A light source device including a first light source part configured to emit a first light flux in a first wavelength band, a second light source part configured to emit a second light flux in a second wavelength band different from the first wavelength band, a third light source part configured to emit a third light flux in a third wavelength band different from the first wavelength band and the second wavelength band, a first light combiner configured to enlarge a light flux width of the first light flux, and combine the first light flux and the second light flux with each other to generate a first combined light flux, and a second light combiner configured to combine the first combined light flux and the third light flux with each other to generate a second combined light flux, wherein a light flux width of the first light flux emitted from the first light source part is same as a light flux width of the second light flux emitted from the second light source part, or smaller than the light flux width of the second light flux emitted from the second light source part, the light flux width of the first light flux emitted from the first light source part is smaller than a light flux width of the third light flux emitted from the third light source part, and the first light combiner is configured to make a light flux width of the first light flux emitted from the first light combiner larger than a light flux width of the first light flux entering the first light combiner so as to approximate the light flux width of the first light flux emitted from the first light combiner to at least one of the light flux width of the second light flux and the light flux width of the third light flux.

According to the configuration of Supplementary Note 1, since the light flux width of the first light flux approximates to at least one of the light flux width of the second light flux and the light flux width of the third light flux, it is possible to realize the light source device which is small in size, and is capable of suppressing the color unevenness of the image.

Supplementary Note 2

The light source device described in Supplementary Note 1, wherein the light flux width of the first light flux emitted from the first light source part is smaller than the light flux width of the second light flux emitted from the second light source part, and the light flux width of the second light flux emitted from the second light source part is smaller than the light flux width of the third light flux emitted from the third light source part.

According to the configuration of Supplementary Note 2, it is easy to adjust the color balance of the second combined light flux when each of the light source parts has a laser source.

Supplementary Note 3

The light source device described in Supplementary Note 2, further including alight flux width reduction element configured to reduce the light flux width of the third light flux emitted from the third light source part.

According to the configuration of Supplementary Note 3, since it is possible to reduce the light flux width of the third light flux which is the largest, it is easy to uniform the light flux widths of all of the light fluxes.

Supplementary Note 4

The light source device described in Supplementary Note 3, wherein the light flux width reduction element is disposed on a light path of the third light flux between the third light source part and the second light combiner.

According to the configuration of Supplementary Note 4, since the light flux width of the third light flux is reduced before the third light flux enters the second light combiner, it is possible to reduce the size of the second light combiner.

Supplementary Note 5

The light source device described in one of Supplementary Note 3 and Supplementary Note 4, wherein the first light combiner is configured to make the light flux width of the first light flux emitted from the first light combiner larger than the light flux width of the first light flux entering the first light combiner so as to approximate the light flux width of the first light flux emitted from the first light combiner to the light flux width of the second light flux, and the light flux width reduction element is configured to make a light flux width of the third light flux emitted from the light flux width reduction element smaller than a light flux width of the third light flux entering the light flux width reduction element so as to approximate the light flux width of the third light flux emitted from the light flux width reduction element to the light flux width of the second light flux.

According to the configuration of Supplementary Note 5, since each of the light flux width of the first light flux which is the smallest and the light flux width of the third light flux which is the largest is made to fit the light flux width of the second light flux, it is possible to efficiently reduce the size of the light source device.

Supplementary Note 6

The light source device described in any one of Supplementary Note 3 through Supplementary Note 5, wherein the light flux width reduction element has an afocal optical element.

According to the configuration of Supplementary Note 6, it is possible to simplify the configuration of the light flux reduction element.

Supplementary Note 7

The light source device described in any one of Supplementary Note 1 through Supplementary Note 6, wherein the first light combiner includes a first reflector configured to transmit a part of the first light flux toward a first direction, reflect another part of the first light flux toward a second direction crossing the first direction, and transmit the second light flux toward the second direction, and a second reflector configured to reflect a part of the first light flux transmitted through the first reflector, toward the second direction, and transmit the second light flux toward the second direction.

According to the configuration of Supplementary Note 7, it is possible to appropriately adjust the light flux width of the first light flux by changing the distance between the first reflector and the second reflector.

Supplementary Note 8

The light source device described in Supplementary Note 7, wherein the first light combiner further includes a light guide part configured to guide the first light flux between the first reflector and the second reflector, and the first reflector and the second reflector are provided to the light guide part.

According to the configuration of Supplementary Note 8, since the first reflector and the second reflector are supported by the light guide part, it is easy to easily improve the relative positional accuracy between the first reflector and the second reflector. Further, since the support member for separately supporting the first reflector and the second reflector becomes unnecessary, it is possible to make a contribution to the reduction in size of the light source device.

Supplementary Note 9

The light source device described in any one of Supplementary Note 1 through Supplementary Note 8, further including a first diffuser which is disposed between the first light combiner and the second light combiner, and is configured to diffuse the first combined light flux, a second diffuser which is disposed between the third light source part and the second light combiner, and is configured to diffuse the third light flux, and a third diffuser which is disposed at a light exit side of the second light combiner, and is configured to diffuse the second combined light flux.

According to the configuration of Supplementary Note 9, it is possible to suppress the speckle noise of the image when applying the light source device to the projector.

Supplementary Note 10

The light source device described in one of Supplementary Note 7 and Supplementary Note 8, wherein the first light source part includes a first light emitting element configured to emit first light constituting the first light flux, and a first substrate having a first surface configured to support the first light emitting element, the second light source part includes a second light emitting element configured to emit second light constituting the second light flux, and a second substrate having a second surface configured to support the second light emitting element, the third light source part includes a third light emitting element configured to emit third light constituting the third light flux, and a third substrate having a third surface configured to support the third light emitting element, the first surface and the second surface are arranged on a same imaginary plane, and the third surface is arranged so as to cross the imaginary plane.

According to the configuration of Supplementary Note 10, it is possible to efficiently arrange the light source parts, and it is possible to achieve the reduction in size of the light source device. Further, when disposing the heatsink for cooling the light source parts, it is possible to achieve commonalization of the heatsink in the first light source part and the second light source part.

Supplementary Note 11

The light source device described in Supplementary Note 10, further including a third reflector configured to reflect the first light flux emitted from the first light source part to guide the first light flux to the first reflector, wherein when viewed along an emission direction of the third light flux emitted from the third light source part, a light path of the first light flux reflected by the third reflector is configured to overlap the third surface.

According to the configuration of Supplementary Note 11, it is possible to achieve the reduction in size of the light source device in particular in an extension direction of the third surface.

Supplementary Note 12

The light source device described in any one of Supplementary Note 1 through Supplementary Note 11, wherein the first light flux is a blue light flux, the second light flux is a green light flux, and the third light flux is a red light flux.

According to the configuration of Supplementary Note 12, it is possible to obtain the second combined light flux having the white color excellent in white balance.

Supplementary Note 13

A light source device including a first light source part configured to emit a first light flux in a first wavelength band, a second light source part configured to emit a second light flux in a second wavelength band different from the first wavelength band, a third light source part configured to emit a third light flux in a third wavelength band different from the first wavelength band and the second wavelength band, a first light combiner configured to enlarge light flux widths of the first light flux and the second light flux, and emit a first combined light flux obtained by combining the first light flux, the second light flux, and the third light flux with each other, and a second light combiner configured to make a second combined light flux obtained by combining a part of the first light flux, a part of the second light flux, and a part of the third light flux with each other enter the first light combiner, wherein the light flux width of the first light flux emitted from the first light source part is same as the light flux width of the second light flux emitted from the second light source part, the light flux width of the first light flux emitted from the first light source part and the light flux width of the second light flux emitted from the second light source part are smaller than a light flux width of the third light flux emitted from the third light source part, the second light combiner is configured to transmit the part of the first light flux and the part of the second light flux to make the part of the first light flux and the part of the second light flux enter the first light combiner, and reflect the part of the third light flux to make the part of the third light flux enter the first light combiner, and the first light combiner is configured to make a light flux width of the first light flux and a light flux width of the second light flux emitted from the first light combiner larger than a light flux width of the first light flux and a light flux width of the second light flux entering the first light combiner so as to approximate the light flux width of the first light flux and the light flux width of the second light flux emitted from the first light combiner to the light flux width of the third light flux emitted from the first light combiner, and combine another part of the first light flux, another part of the second light flux, another part of the third light flux, and the second combined light flux with each other to generate the first combined light flux.

According to the configuration of Supplementary Note 13, since the light flux widths of the first light flux and the second light flux approximate to the light flux width of the third light flux, it is possible to realize the light source device which is small in size, and is capable of suppressing the color unevenness of the image.

Supplementary Note 14

A projector including the light source device described in any one of Supplementary Note 1 through Supplementary Note 13, a light modulation device configured to modulate light including the second combined light flux emitted from the light source device in accordance with image information, and a projection optical device configured to project the light modulated by the light modulation device.

According to the configuration of Supplementary Note 15, it is possible to realize the projector capable of projecting the image small in color unevenness.

What is claimed is:

1. A light source device comprising:

a first light source configured to emit a first light flux in a first wavelength band;

a second light source configured to emit a second light flux in a second wavelength band different from the first wavelength band;

a third light source configured to emit a third light flux in a third wavelength band different from the first wavelength band and the second wavelength band;

a first light combiner configured to enlarge a first light flux width of the first light flux, and combine the first light flux and the second light flux with each other to generate a first combined light flux;

a second light combiner configured to combine the first combined light flux and the third light flux with each other to generate a second combined light flux; and a light flux width reduction part, wherein the first light flux width of the first light flux emitted from the first light source is equal to a second light flux width of the second light flux emitted from the second light source, or smaller than the second light flux width of the second light flux emitted from the second light source, the first light flux width is smaller than a third light flux width of the third light flux emitted from the third light source, the first light combiner is configured to make a fourth light flux width of the first light flux emitted from the first light combiner larger than a fifth light flux width of the first light flux entering the first light combiner so as to approximate the first light flux width to at least one of the second light flux width and the third light flux width, the first light flux width is smaller than the second light flux width, the second light flux width is smaller than the third light flux width, the light flux width reduction part is configured to reduce the third light flux width, the first light combiner is configured to make the fourth light flux width larger than the fifth light flux width so as to approximate the first light flux width to the second light flux width, and the light flux width reduction part is configured to make a sixth light flux width of the third light flux emitted from the light flux width reduction part smaller than a seventh light flux width of the third light flux entering the light flux width reduction part so as to approximate the sixth light flux width to the second light flux width of the second light flux.

2. The light source device according to claim 1, wherein the light flux width reduction part is disposed on a light path of the third light flux between the third light source and the second light combiner.

3. The light source device according to claim 1, wherein the light flux width reduction part has an afocal optical element.

4. The light source device according to claim 1, wherein the first light combiner includes
a first reflector configured to transmit a part of the first light flux toward a first direction, reflect another part of the first light flux toward a second direction crossing the first direction, and transmit the second light flux toward the second direction, and
a second reflector configured to reflect a part of the first light flux transmitted through the first reflector, toward the second direction, and transmit the second light flux toward the second direction.

5. The light source device according to claim 4, wherein the first light combiner further includes a light guide part configured to guide the first light flux between the first reflector and the second reflector, and
the first reflector and the second reflector are provided to the light guide part.

6. The light source device according to claim 4, wherein the first light source includes a first light emitting element configured to emit first light constituting the first light flux, and a first substrate having a first surface configured to support the first light emitting element,
the second light source includes a second light emitting element configured to emit second light constituting the second light flux, and a second substrate having a second surface configured to support the second light emitting element,
the third light source includes a third light emitting element configured to emit third light constituting the third light flux, and a third substrate having a third surface configured to support the third light emitting element,
the first surface and the second surface are arranged on a same imaginary plane, and
the third surface is arranged so as to cross the imaginary plane.

7. The light source device according to claim 6, further comprising:
a third reflector configured to reflect the first light flux emitted from the first light source to guide the first light flux to the first reflector, wherein
when viewed along an emission direction of the third light flux emitted from the third light source, a light path of the first light flux reflected by the third reflector is configured to overlap the third surface.

8. The light source device according to claim 1, further comprising:
a first diffuser which is disposed between the first light combiner and the second light combiner, and is configured to diffuse the first combined light flux;
a second diffuser which is disposed between the third light source and the second light combiner, and is configured to diffuse the third light flux; and
a third diffuser which is disposed at a light exit side of the second light combiner, and is configured to diffuse the second combined light flux.

9. The light source device according to claim 1, wherein the first light flux is a blue light flux, the second light flux is a green light flux, and the third light flux is a red light flux.

10. A projector comprising:
the light source device according to claim 1;
a light modulation device configured to modulate light including the second combined light flux emitted from the light source device in accordance with image information; and
a projection optical device configured to project the light modulated by the light modulation device.

11. A light source device comprising:
a first light source configured to emit a first light flux in a first wavelength band;
a second light source configured to emit a second light flux in a second wavelength band different from the first wavelength band;
a third light source configured to emit a third light flux in a third wavelength band different from the first wavelength band and the second wavelength band;
a first light combiner configured to enlarge light flux widths of the first light flux and the second light flux, and emit a first combined light flux obtained by combining the first light flux, the second light flux, and the third light flux with each other; and
a second light combiner configured to make a second combined light flux obtained by combining a part of the first light flux, a part of the second light flux, and a part of the third light flux with each other enter the first light combiner, wherein
the light flux width of the first light flux emitted from the first light source is equal to the light flux width of the second light flux emitted from the second light source,
the light flux width of the first light flux emitted from the first light source and the light flux width of the second light flux emitted from the second light source are smaller than a light flux width of the third light flux emitted from the third light source,
the second light combiner is configured to transmit the part of the first light flux and the part of the second light flux to make the part of the first light flux and the part of the second light flux enter the first light combiner, and reflect the part of the third light flux to make the part of the third light flux enter the first light combiner, and
the first light combiner is configured to make a light flux width of the first light flux and a light flux width of the second light flux emitted from the first light combiner larger than a light flux width of the first light flux and a light flux width of the second light flux entering the first light combiner so as to approximate the light flux width of the first light flux and the light flux width of the second light flux emitted from the first light combiner to the light flux width of the third light flux emitted from the first light combiner, and combine another part of the first light flux, another part of the second light flux, another part of the third light flux, and the second combined light flux with each other to generate the first combined light flux.

12. A light source device comprising:
a first light source configured to emit a first light flux in a first wavelength band;
a second light source configured to emit a second light flux in a second wavelength band different from the first wavelength band;
a third light source configured to emit a third light flux in a third wavelength band different from the first wavelength band and the second wavelength band;
a first light combiner configured to enlarge a first light flux width of the first light flux, and combine the first light flux and the second light flux with each other to generate a first combined light flux;
a second light combiner configured to combine the first combined light flux and the third light flux with each other to generate a second combined light flux;

a first diffuser which is disposed between the first light combiner and the second light combiner, and is configured to diffuse the first combined light flux;

a second diffuser which is disposed between the third light source and the second light combiner, and is configured to diffuse the third light flux; and a third diffuser which is disposed at a light exit side of the second light combiner, and is configured to diffuse the second combined light flux, wherein the first light flux width of the first light flux emitted from the first light source is equal to a second light flux width of the second light flux emitted from the second light source, or smaller than the second light flux width of the second light flux emitted from the second light source, the first light flux width is smaller than a third light flux width of the third light flux emitted from the third light source, and the first light combiner is configured to make a fourth light flux width of the first light flux emitted from the first light combiner larger than a fifth light flux width of the first light flux entering the first light combiner so as to approximate the first light flux width to at least one of the second light flux width and the third light flux width.

* * * * *